United States Patent
Gouko et al.

(10) Patent No.: US 11,067,519 B2
(45) Date of Patent: Jul. 20, 2021

(54) STRAIN DETECTING DEVICE AND DIAGNOSING DEVICE

(71) Applicant: DENSO CORPORATION, Kariya (JP)

(72) Inventors: Norio Gouko, Kariya (JP); Toshihisa Taniguchi, Kariya (JP); Atusi Sakaida, Kariya (JP); Keiji Okamoto, Kariya (JP); Yoshihiko Shiraishi, Kariya (JP); Masahiro Asano, Kariya (JP)

(73) Assignee: DENSO CORPORATION, Kariya (JP)

( * ) Notice: Subject to any disclaimer, the term of this patent is extended or adjusted under 35 U.S.C. 154(b) by 374 days.

(21) Appl. No.: 16/176,313

(22) Filed: Oct. 31, 2018

(65) Prior Publication Data

US 2019/0195817 A1 Jun. 27, 2019

(30) Foreign Application Priority Data

Dec. 27, 2017 (JP) .............................. JP2017-251990

(51) Int. Cl.
*G01K 17/00* (2006.01)
*G01N 25/16* (2006.01)
*G01K 17/20* (2006.01)
*G01L 1/00* (2006.01)

(52) U.S. Cl.
CPC ............ *G01N 25/16* (2013.01); *G01K 17/00* (2013.01); *G01K 17/20* (2013.01); *G01L 1/00* (2013.01)

(58) Field of Classification Search
CPC ........ G01N 25/16; G01K 17/20; G01K 17/00; G01L 1/00; G01L 1/20; G01L 5/24
See application file for complete search history.

(56) References Cited

U.S. PATENT DOCUMENTS

| 6,532,824 | B1 | 3/2003 | Ueno et al. | |
|---|---|---|---|---|
| 9,659,416 | B2 * | 5/2017 | Tanaka | ...................... G07C 5/08 |
| 2007/0131529 | A1 * | 6/2007 | Kim | ........................ G01L 1/205 |
| | | | | 200/502 |
| 2016/0109286 | A1 * | 4/2016 | Yazaki | ..................... H01L 35/32 |
| | | | | 73/649 |
| 2018/0149475 | A1 | 5/2018 | Gouko et al. | |

* cited by examiner

*Primary Examiner* — Lisa M Caputo
*Assistant Examiner* — Nasir U. Ahmed
(74) *Attorney, Agent, or Firm* — Posz Law Group, PLC

(57) ABSTRACT

A strain detecting device includes a sensor portion and a covering elastic deformation member. The elastic deformation member generates heat when compressed and absorbs heat when expanded, resulting in heat flux. The sensor portion includes first and second heat flux sensors, each of which has first and second sensor surfaces formed opposite to each other. Each sensor outputs a strain-indicating signal of a polarity when the heat flux passes through the sensor, from the first sensor surface to the second sensor surface, and outputs a strain-indicating signal of an opposite polarity when the heat flux passes through the sensor in reverse, from the second sensor surface to the first sensor surface. The first sensor surfaces are opposed to each other across a heat absorbing member interposed between the sensors. The sensor portion generates signals based on the heat flux generated by deformation of the elastic deformation member.

7 Claims, 12 Drawing Sheets

STRAIN DETECTING DEVICE AND DIAGNOSING DEVICE

CROSS REFERENCE TO RELATED APPLICATION

This application is based on Japanese Patent Application No. 2017-251990 filed on Dec. 27, 2017, the disclosure of which is incorporated herein by reference.

FIELD OF TECHNOLOGY

The present disclosure relates to a strain detecting device using a heat flux sensor and further relates to a diagnosing device using the strain detecting device.

BACKGROUND

A strain detecting device is known in the art, for example, as disclosed in Japanese Patent Publication No. 2001-21308. The strain detecting device has a sensor portion for detecting a displacement of a part of a measuring object. The sensor portion has a strain gauge, a resistance of which is changed depending on a deformation of the strain gauge.

It is necessary in the above strain detecting device having the strain gauge to carry out an offset adjustment after the strain detecting device is mounted to a part being measured, in order to increase detection accuracy. It is necessary to separately provide an adjusting circuit and so on so as to carry out the offset adjustment. As above, a structure of the above strain detecting device may become complicated when increasing the detection accuracy.

SUMMARY OF THE DISCLOSURE

The present disclosure is made in view of the above problem. It is an object of the present disclosure to provide a strain detecting device which is able to improve detection accuracy and to make a structure of the strain detecting device simpler. In addition, it is another object of the present disclosure to provide a diagnosing device using the strain detecting device.

According to a feature of the present disclosure, the strain detecting device comprises;

(i) a sensor portion for detecting heat flux; and (ii) an elastic deformation member covering the sensor portion, wherein the elastic deformation member generates heat when it is compressed, while the elastic deformation member absorbs heat when it is expanded.

The sensor portion includes two heat flux sensors, each of which has;

a first sensor surface formed on a side of the heat flux sensor; and a second sensor surface formed on another side of the heat flux sensor opposite to the first sensor surface, wherein each of the heat flux sensors outputs a first sensor signal having a positive or a negative polarity in a first case in which the heat flux passes through the heat flux sensor in a direction from the first sensor surface to the second sensor surface, while each of the heat flux sensors outputs a second sensor signal having a polarity opposite to that of the first case in a second case in which the heat flux passes through the heat flux sensor in a reversed direction from the second sensor surface to the first sensor surface.

The sensor portion includes a heat absorbing member interposed between the two heat flux sensors and having a predetermined heat capacity.

The two heat flux sensors are arranged in such a way that the first sensor surfaces of the respective heat flux sensors are opposed to each other across the heat absorbing member, and each of the heat flux sensors outputs the sensor signal depending on the heat flux generated by deformation of the elastic deformation member when external force is applied to the strain detecting device.

According to the above structure, the sensor portion is composed of the heat flux sensor and the elastic deformation member is arranged so as to cover the sensor portion. The strain detecting device outputs the sensor signal depending on the deformation of the elastic deformation member during a predetermined period shortly after the strain detecting device is mounted to or put on a part being measured (a measuring object). Since the heat flux passing through the sensor portion no longer exists after the predetermined period, the sensor signal becomes zero unless the external force is separately applied to the strain detecting device. In other words, the strain detecting device can precisely detect the displacement of the measuring object without the offset adjustment after the strain detecting device has been mounted to the part being measured. It is, therefore, possible to make the structure of the strain detecting device simpler, because the offset adjustment is not necessary.

In addition, since the sensor portion is covered by the elastic deformation member, an impact by the external force is not directly applied to the sensor portion. It is thereby possible to increase resistance against the impact.

In the strain detecting device, the sensor portion detects the heat flux generated by the deformation of the elastic deformation member. The elastic deformation member has functions not only for protecting the sensor portion but also for generating the heat flux passing through the sensor portion (that is, a function as a heat source). It is thereby possible to reduce a number of parts for the strain detecting device, when compared with a case in which a part for generating the heat flux and a part for protecting the sensor portion are independently provided.

In addition, the two heat flux sensors are arranged in such a way that the first sensor surfaces of the respective heat flux sensors are opposed to each other across the heat absorbing member, which is interposed between the two heat flux sensors. As a result, the strain generated in the strain detecting device can be easily and surely detected.

For example, when a sensor-surface opposing portion of the elastic deformation member covering the first heat flux sensor is compressed, the heat flux passing through the first heat flux sensor in the direction from the first sensor surface to the second sensor surface is generated. The first heat flux sensor outputs the sensor signal having the positive polarity. The heat flux having passed through the first heat flux sensor hardly passes through the second heat flux sensor due to the heat absorbing member. In the same manner, when a sensor-surface opposing portion of the elastic deformation member covering the second heat flux sensor is compressed, the heat flux passing through the second heat flux sensor in the direction from the first sensor surface to the second sensor surface is generated. The second heat flux sensor likewise outputs the sensor signal having the positive polarity. The heat flux having passed through the second heat flux sensor cannot further pass through the first heat flux sensor due to the heat absorbing member. As above, at least one of the heat flux sensors outputs the sensor signal having the positive polarity, when the elastic deformation member is compressed. On the other hand, when the elastic deformation member is expanded, at least one of the heat flux sensors outputs the sensor signal having the negative polarity.

Accordingly, it s possible to easily and surely detect the deformation of the elastic deformation member based on the sensor signal. In other words, it is possible to easily and surely detect the strain generated in the strain detecting device.

According to another feature of the present disclosure, a diagnosing device diagnoses a fastening condition of a fastener unit, which comprises;

a first fastener member;

a second fastener member; and a fastening member for fastening the first and the second fastener members to each other.

The diagnosing device comprises;

the above strain detecting device; and a control unit for carrying out a diagnosing process for the fastening condition of the fastener unit.

The strain detecting device is located in a sensor insertion hole formed in the first and the second fastener members, so that external force generated in the fastener unit is applied to the strain detecting device.

The control unit compares a sensor signal outputted from the strain detecting device with a predetermined determination parameter, to thereby diagnose the fastening condition of the fastener unit.

According to the above structure, the diagnosing device is constructed by use of the strain detecting device of the present disclosure. In the diagnosing device, the sensor insertion hole is formed in the existing fastener unit, the strain detecting device is located in the sensor insertion hole and the control unit is provided. Accordingly, the diagnosing device can be easily applied to the existing fastener unit.

According to a further feature of the present disclosure, the diagnosing device diagnoses a holding condition of a holding unit, which comprises;

a base portion; and multiple arm portions movably supported by the base portion for holding a holding object, wherein each of the arm portions is composed of the strain detecting device of the present disclosure explained above.

The diagnosing device comprises a control unit for carrying out a diagnosing process for the holding condition of the holding unit.

The control unit compares a sensor signal outputted from the strain detecting device with a predetermined determination parameter, to thereby diagnose the holding condition of the holding unit.

As above, the diagnosing device is constructed by use of the strain detecting device of the present disclosure. According to the above structure, the existing holding unit is constructed by the strain detecting device and the control unit is provided. Accordingly, the diagnosing device can be easily applied to the existing holding unit.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION OF THE EMBODIMENTS

Figure 1:
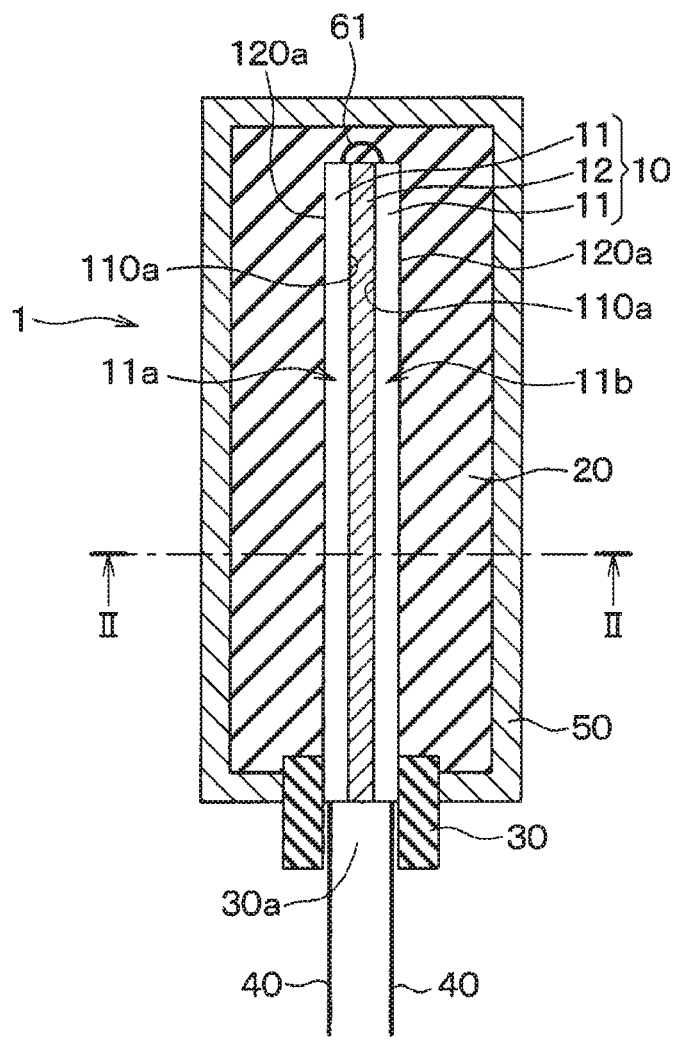
FIG. 1 is a schematic cross sectional view showing a strain detecting device according to a first embodiment of the present disclosure.

The present disclosure will be explained hereinafter by way of multiple embodiments and/or modifications with reference to the drawings. The same reference numerals are given to the same or similar structures and/or portions in order to avoid repeated explanation.

First Embodiment

Figure 2:
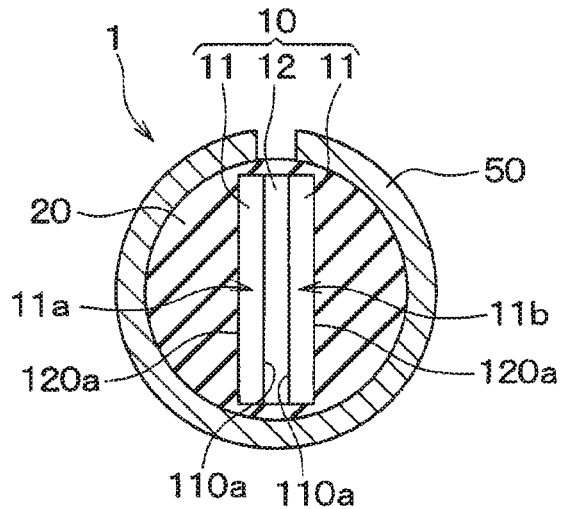
FIG. 2 is a schematic cross sectional view taken along a line II-II in FIG. 1.

A first embodiment will be explained. As shown in FIGS. 1 and 2, a strain detecting device 1 of the present embodiment has a sensor portion 10, an elastic deformation member 20, a supporting portion 30, wiring members 40, a housing 50 and so on.

The sensor portion 10 includes two heat flux sensors 11 and a heat absorbing member 12, which is arranged between the two heat flux sensors 11. In the present embodiment, each of the heat flux sensors 11 and the heat absorbing member 12 is formed in a flat plate shape. Each of the flat plate shapes is identical to one another.

Figure 3:
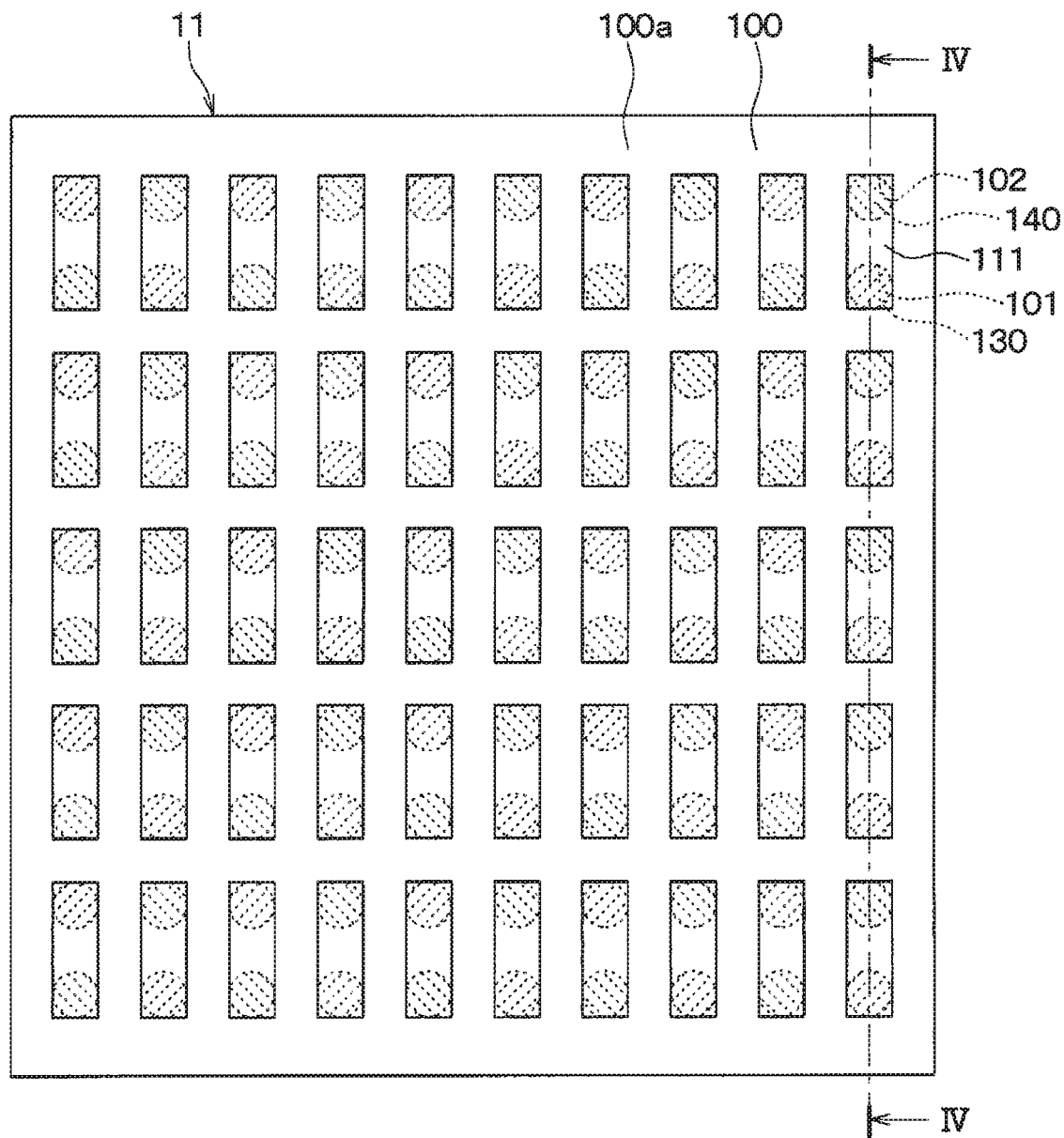
FIG. 3 is a schematic top plane view showing a structure of a heat flux sensor.

A structure of the heat flux sensor 11 will be explained with reference to FIGS. 3 and 4. Each of the heat flux sensors 11 has the same structure to each other. In FIG. 3, a front-side protecting member 110 (explained below) is omitted.

Figure 4:
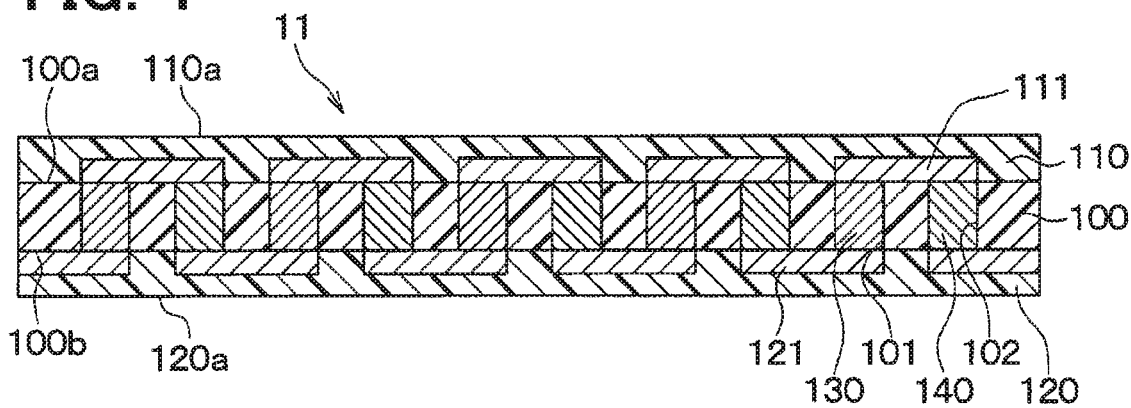
FIG. 4 is a schematic cross sectional view taken along a line IV-IV in FIG. 3.

As shown in FIGS. 3 and 4, in the heat flux sensor 11, an insulating substrate 100, the front-side protecting member 110 and a rear-side protecting member 120 are integrally formed as one unit. In such an integrated structure, first interlayer connecting members 130 and second interlayer connecting members 140 are alternately arranged in series. Each of the insulating substrate 100, the front-side protecting member 110 and the rear-side protecting member 120 is formed in a film shape and made of resin material having flexibilty, for example, thermoplastic resin.

Multiple first via holes 101 and second via holes 102 are formed in the insulating substrate 100 in such a way that each of the via holes 101 and 102 passes through the insulating substrate 100 in a thickness direction thereof. The first interlayer connecting members 130 and the second interlayer connecting members 140 are made of thermoelectric material, for example, metal, a semiconductor or the like, different from each other. Each of the first and the second interlayer connecting members 130 and 140 is embedded into respective via holes 101 and 102.

A front-side conductor pattern 111 is formed on a front-side surface 100a of the insulating substrate 100. In a similar manner, a rea-side conductor pattern 121 is formed on a rear-side surface 100b of the insulating substrate 100. Each of the first and the second interlayer connecting members 130 and 140 are electrically connected in series by the front-side and the rear-side conductor patterns 111 and 121. In other words, in the heat flux sensor 11, a front-side connecting portion for the first interlayer connecting member 130 as well as a front-side connecting portion for the second interlayer connecting member 140 is formed by the front-side conductor pattern 111. In a similar manner, a rear-side connecting portion for the first interlayer connecting member 130 as well as a rear-side connecting portion for the second interlayer connecting member 140 is formed by the rear-side conductor pattern 121.

When heat flux passes through the heat flux sensor 11 in its thickness direction, temperature difference is generated between the front-side and the rear-side connecting portions of the respective first and the second interlayer connecting members 130 and 140. A thermal elective force is generated in each of the first and the second interlayer connecting members 130 and 140 by Seebeck effect. The heat flux sensor 11 outputs the thermal electromotive force (for example, voltage) as a sensor signal. The heat flux is an amount of heat, which transversely passes across the heat flux sensor 11 for its unit area per unit time. A dimension thereof is $W/m^2$.

In the present disclosure, an upper-side surface of the front-side protecting member 110 on a side opposite to the insulating substrate 100 is referred to as a first sensor surface 110a, and a lower-side surface of the rear-side protecting member 120 on a side opposite to the insulating substrate 100 is referred to as a second sensor surface 120a. In addition, one of the heat flux sensors 11 (a left-hand side sensor in FIG. 1 or 2) is referred to as a first heat flux sensor 11a, while the other heat flux sensor 11 (a right-hand sensor in FIG. 1 or 2) is referred to as a second heat flux sensor 11b. The sensor signal outputted from the first heat flux sensor 11a is referred to as a first sensor signal, while the sensor signal outputted from the second heat flux sensor 11b is referred to as a second sensor signal.

The heat flux sensor 11 outputs the sensor signal having a positive polarity, when the heat flux passes through the heat flux sensor 11 in the direction from the second sensor surface 120a to the first sensor surface 110a. On the other hand, the heat flux sensor 11 outputs the sensor signal having a negative polarity, when the heat flux passes through the heat flux sensor 11 in the reversed direction from the first sensor surface 110a to the second sensor surface 120a.

The heat absorbing member 12 is made of metal material, polyimide resin material or the like, so that the heat absorbing member 12 has a predetermined heat capacity. The elastic deformation member 20 is provided so as to surround the heat flux sensors 11. There are heat fluxes passing through each of the heat flux sensors 11 from the elastic deformation member 20 to the heat absorbing member 12. The heat absorbing member 12 is arranged at a position between the two heat flux sensors 11 (11a and 11b). The material, the thickness or the like for the heat absorbing member 12 are so designed that the heat absorbing member 12 has the predetermined heat capacity in order to prevent the heat flux having passed through one of the heat flux sensors 11 (for example, the first heat flux sensor 11a) from further passing through the other heat flux sensor 11 (for example, the second heat flux sensor 11b). In other words, the material, the thickness and so on for the heat absorbing member 12 are so designed that the heat flux having passed through one of the heat flux sensors 11 does not have an influence on the other heat flux sensor 11.

As shown in FIGS. 1 and 2, the heat absorbing member 12 is arranged between the first and the second heat flux sensors 11a and 11b. More exactly, the first sensor surfaces 110a of the respective heat flux sensors 11a and 11b are opposed to each other in a radial direction of the sensor portion 10 (that is, the thickness direction of each heat flux sensor). The front-side conductor patterns 111 of the respective heat flux sensors 11a and 11b are electrically connected in series with each other by an internal wiring 61. In the present embodiment, the first heat flux sensor 11a and the second heat flux sensor 11b are electrically connected to each other by the internal wiring 61 at a position opposite to the supporting portion 30 in an axial direction of the strain detecting device 1.

The sensor portion 10 has the above structure including the heat flux sensors 11 for outputting the sensor signals in accordance with the heat flux. As will be explained below, the sensor portion 10 detects the heat flux generated by deformation of the elastic deformation member 20, even when it is the deformation having a submicron level. Namely, the sensor portion 10 can detect the deformation of the elastic deformation member 20 of the submicron level. The sensor portion 10 can detect a minute strain of the strain detecting device 1.

The elastic deformation member 20 is made of rubber, resin, metal material capable of being elastically deformed, or the like, so as to totally cover the sensor portion 10. Solder, aluminum or the like may be used as the metal material, which is capable of being elastically deformed.

The supporting portion 30 is made of a heat shrinkable tube of a cylindrical shape having a hollow portion 30a and supports the sensor portion 10. In the present embodiment, a lower part of the sensor portion 10 is inserted into the hollow portion 30a of the supporting portion 30, so that the supporting portion 30 supports the sensor portion 10.

The wiring members 40 electrically connect the sensor portion 10 to an electronic control unit (not shown) located at an outside of the strain detecting device 1. In the present embodiment, each end of the wiring members 40 is electrically connected to each of the rear-side conductor patterns 121 of the first and the second heat flux sensors 11a and 11b, at a position inside of the hollow portion 30a. Each other end of the wiring members 40 is connected to the electronic control unit.

The housing 50 is made of material, which is elastically deformable when external force is applied to the housing 50. In the present embodiment, the housing 50 is made of a spring pin made of metal, such as, stainless material. The housing 50 entirely covers the elastic deformation member 20.

A basic operation of the strain detecting device 1 will be explained with reference to FIGS. 5A to 5C and FIGS. 6A to 6C. In the drawings of FIGS. 5A to 5C and FIGS. 6A to 6C, the housing 50 is omitted.

When the external force is applied to the housing 50, the housing 50 is elastically deformed and thereby the elastic deformation member 20 is elastically deformed. In other words, the elastic deformation member 20 is compressed when the housing 50 is strained. The elastic deformation member 20 produces heat, when it is compressed.

Figure 5A:
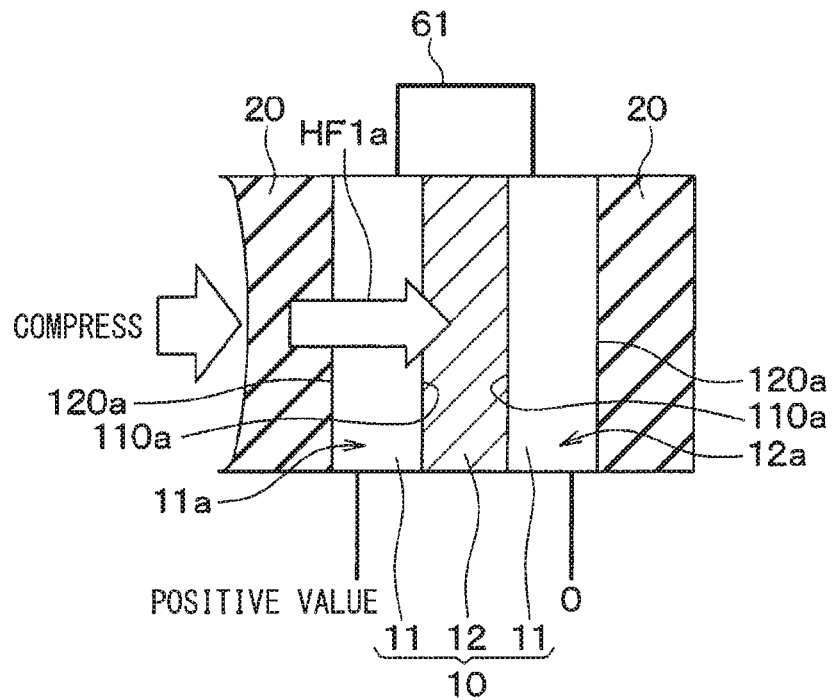
FIGS. 5A to 5C are schematic cross sectional views, each of which shows heat-generation heat flux generated in the strain detecting device.

As shown in FIG. 5A, when a first portion of the elastic deformation member 20, which covers the first heat flux sensor 11a (for example, a sensor-surface opposing portion), is compressed, a first heat-generation heat flux HF1a is produced in the strain detecting device 1. The first heat-generation heat flux HF1a passes from the first portion (the compressed portion) to the heat absorbing member 12 through the first heat flux sensor 11a. In other words, the first heat-generation heat flux HF1a, which passes in the direction from the second sensor surface 120a to the first sensor surface 110a of the first heat flux sensor 11a, is produced in the strain detecting device 1. The first sensor signal outputted from the first heat flux sensor 11a has a positive value.

Figure 5B:
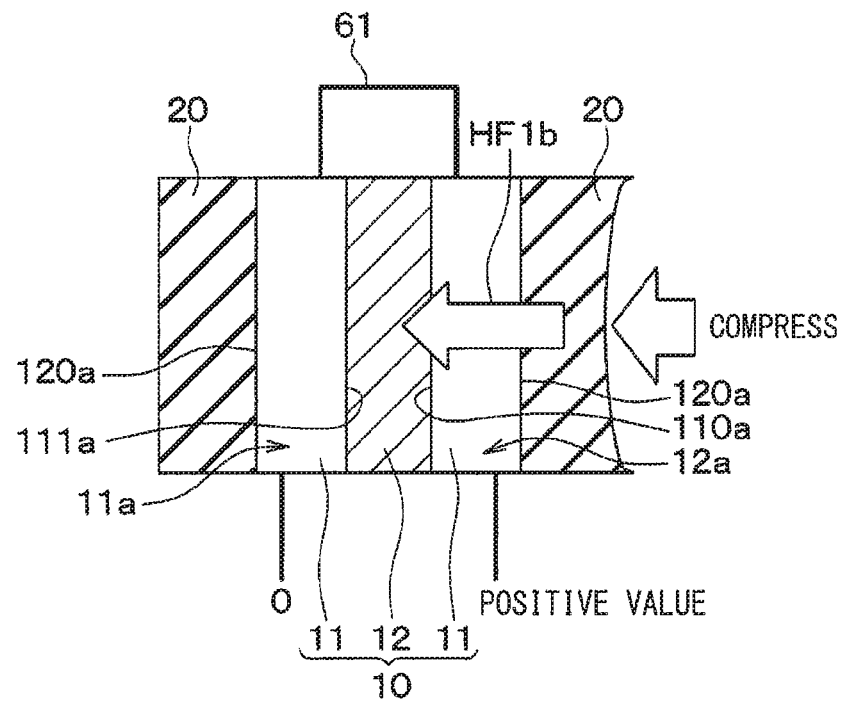

In a similar manner, as shown in FIG. 5B, when a second portion of the elastic deformation member 20, which covers the second heat flux sensor 11b (for example, a sensor-surface opposing portion), is compressed, a second heat-generation heat flux HF1b is produced in the strain detecting device 1. The second heat-generation heat flux HF1b passes from the second portion (the compressed portion) to the heat absorbing member 12 through the second heat flux sensor 11b. In other words, the second heat-generation heat flux HF1b, which passes in the direction from the second sensor surface 120a to the first sensor surface 110a of the second heat flux sensor 11b, is produced in the strain detecting device 1. The second sensor signal outputted from the second heat flux sensor 11b also has the positive value.

Figure 5C:
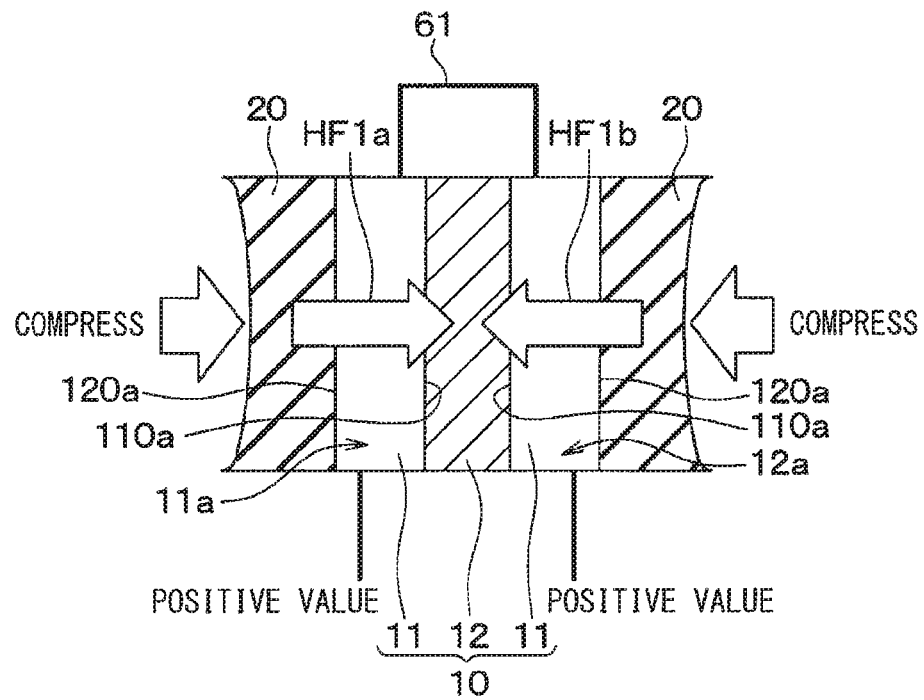

As shown in FIG. 5C, when both of the first portion and the second portion of the elastic deformation member 20, which respectively cover the first and the second heat flux sensors 11a and 11b, are compressed, the first heat-generation heat flux KF1a and the second heat-generation heat flux HF1b are produced in the strain detecting device 1. Each of the first sensor signal and the second sensor signal, which are respectively outputted from the first and the second heat flux sensors 11a and 11b, has the positive value.

As already explained, the heat absorbing member 12 has the predetermined heat capacity, so that the heat flux having passed from the elastic deformation member 20 to the heat absorbing member 12 through one of the heat flux sensors 11 cannot further pass through the other heat flux sensor 11. For example, as shown in FIG. 5A, when the first heat-generation heat flux HF1a is produced and passes through the first heat flux sensor 11a, the heat absorbing member 12 prevents the first heat-generation heat flux HF1a from further passing through the second heat flux sensor 11b. Therefore, in FIG. 5A, the heat flux passing through the second heat flux sensor 11b from the first sensor surface 110a to the second sensor surface 120a is hardly produced. As a result, when the first heat-generation heat flux HF1a is produced, the second sensor signal outputted from the second heat flux sensor 11b and produced by the first heat-generation heat flux HF1a is almost zero.

In a similar manner, in a case of FIG. 5B, when the second heat-generation heat flux HF1b passing through the second heat flux sensor 11b is produced, the heat absorbing member 12 prevents the second heat-generation heat flux HF1b from further passing through the first heat flux sensor 11a. In other words, in the case of FIG. 5B, the heat flux passing through the first heat flux sensor 11a from the first sensor surface 110a to the second sensor surface 120a is hardly produced. As a result, even when the second heat-generation heat flux HF1b is produced, the first sensor signal outputted from the first heat flux sensor 11a and produced by the second heat-generation heat flux HF1b is almost zero.

In addition, when the first and the second heat-generation heat fluxes HF1a and HF1b are produced, as shown in FIG. 5C, the heat absorbing member 12 prevents the heat flux having passed through one of the heat flux sensors 11 from further passing through the other heat flux sensor 11. Therefore, in the case of FIG. 5C, each of the first sensor signal outputted from the first heat flux sensor 11a and the second sensor signal outputted from the second heat flux sensor 11b has the positive value.

In the sensor portion 10, the first heat flux sensor 11a and the second heat flux sensor 11b are electrically connected to each other in series. When the external force is applied to the strain detecting device 1, that is, when the strain detecting device 1 is deformed, the sensor portion 10 outputs its sensor signal, which is a sum of the first sensor signal and the second sensor signal. In the cases of FIGS. 5A to 5C, the sensor signal of the sensor portion 10 has the positive value.

The elastic deformation member 20 produces heat when it is compressed. Temperature of the elastic deformation member 20 is thereby increased. A temperature change of the elastic deformation member 20 for unit time is in proportion to its compression amount for the unit time. In other words, the temperature change of the elastic deformation member 20 for the unit time depends on the compression amount and a deformation speed. The temperature change between the elastic deformation member 20 and the heat absorbing member 12 becomes larger, as the temperature change of the elastic deformation member 20 for the unit time is larger. Therefore, each of the first and the second heat-generation heat fluxes HF1a and HF1b becomes larger, as the temperature change of the elastic deformation member 20 for the unit time is larger. In other words, the sensor portion 10 outputs its sensor signal based on the compression amount of the elastic deformation member 20 for the unit time, when the elastic deformation member 20 is compressed.

When the strain detecting device 1 is released from the external force applied to the housing 50, the elastic deformation member 20 is restored to its initial shape because the housing 50 is restored to its initial shape. The elastic deformation member 20 absorbs heat, when it is restored (expanded) to the initial shape.

Figure 6A:
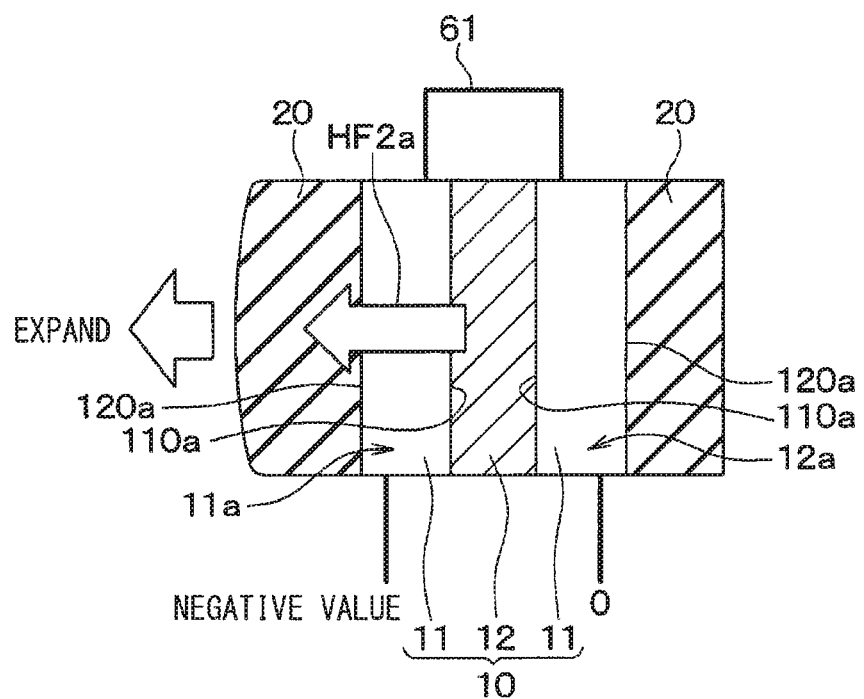
FIGS. 6A to 6C are schematic cross sectional views, each of which shows heat-absorption heat flux generated in the strain detecting device.

As shown in FIG. 6A, when the first portion of the elastic deformation member 20 (for example, the sensor-surface opposing portion), which covers the first heat flux sensor 11a, is expanded, a first heat-absorption heat flux HF2a is produced in the strain detecting device 1. The first heat-absorption heat flux HF2a passes through the first heat flux sensor 11a in the reversed direction from the heat absorbing member 12 to the first portion (the expanded portion). In other words, the first heat-absorption heat flux HF2a, which passes in the reversed direction from the first sensor surface 110a to the second sensor surface 120a of the first heat flux sensor 11a, is produced in the strain detecting device 1. The first sensor signal outputted from the first heat flux sensor 11a has a negative value.

Figure 6B:
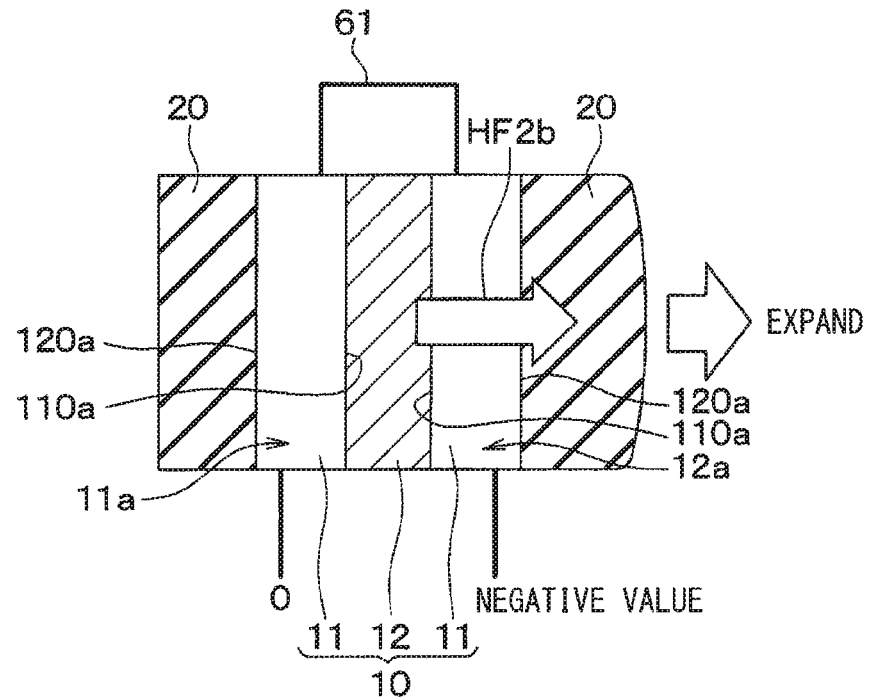

In a similar manner, as shown in FIG. 6B, when the second portion of the elastic deformation member 20 (for example, the sensor-surface opposing portion), which covers the second heat flux sensor 11b, is expanded, a second heat-absorption heat flux HF2b is produced in the strain detecting device 1. The second heat-absorption heat flux HF2b passes through the second heat flux sensor 11b in the reversed direction from the heat absorbing member 12 to the second portion (the expanded portion). In other words, the second heat-absorption heat flux HF2b, which passes in the reversed direction from the first sensor surface 110a to the second sensor surface 120a of the second heat flux sensor 11b, is produced in the strain detecting device 1. The second sensor signal outputted from the second heat flux sensor 11b also has the negative value.

Figure 6C:
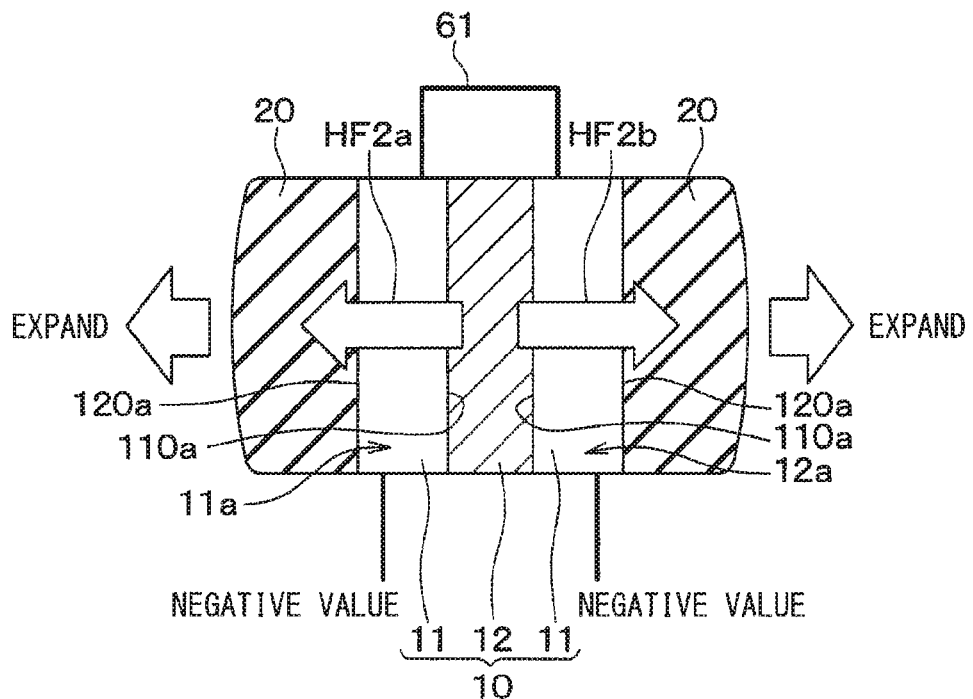

As shown in FIG. 6C, when both of the first portion and the second portion of the elastic deformation member 20, which respectively cover the first and the second heat flux sensors 11a and 11b, are expanded, the first heat-absorption heat flux HF2a and the second heat-absorption heat flux HF2b are produced in the strain detecting device 1. Each of the first sensor signal and the second sensor signal, which are respectively outputted from the first and the second heat flux sensors 11a and 11b, has the negative value.

When the elastic deformation member 20 is not expanded, the heat-absorption heat flux passing through the heat flux sensor 11a/11b from the heat absorption member 12 to the elastic deformation member 20 is not produced. In the case of FIG. 6A, the sensor signal outputted from the second heat flux sensor 11b is almost zero. In a similar manner, in the case of FIG. 6B, the sensor signal outputted from the first heat flux sensor 11a is almost zero.

As already explained, the first heat flux sensor 11a and the second heat flux sensor 11b are electrically connected to each other in series. When the strain detecting device 1 is released from the external force, the sensor portion 10 outputs its sensor signal, which is the sum of the first sensor signal and the second sensor signal. In the cases of FIGS. 6A to 6C, the sensor signal of the sensor portion 10 has the negative value.

The elastic deformation member 20 absorbs heat when it is expanded. The temperature of the elastic deformation member 20 is thereby decreased. A temperature change or the elastic deformation member 20 for unit time is in proportion to its expansion amount for the unit time. In other words, the temperature change of the elastic deformation member 20 for the unit time depends on the expansion amount and the deformation speed. The temperature change between the elastic deformation member 20 and the heat absorbing member 12 becomes larger, as the temperature change of the elastic deformation member 20 for the unit time is larger. Therefore, each of the first and the second heat-absorption heat fluxes HF2a and HF2b becomes larger, as the temperature change of the elastic deformation member 20 for the unit time is larger. In other words, the sensor portion 10 outputs its sensor signal based on the expansion amount of the elastic deformation member 20 for the unit time, when the elastic deformation member 20 is expanded.

According to the strain detecting device 1 of the present embodiment, it is possible to detect whether the external force is applied to the strain detecting device 1 or whether the strain detecting device 1 is released from the external force, based on the polarity (positive or negative) of the sensor signal from the sensor portion 10. An amplitude of the heat flux becomes larger, as the amount of the heat generation or the amount of the heat absorption of the elastic deformation member 20 becomes larger for the unit time. Namely, the amplitude of the heat flux becomes larger, as the deformation amount of the elastic deformation member 20 becomes larger for the unit time. In other words, the amplitude of the heat flux becomes larger, as the external force having influence on the housing 50 becomes larger. It is, therefore, possible to detect the amplitude of the external force having influence on the strain detecting device 1 based on the amplitude of the sensor signal (an absolute value thereof).

Since the heat flux sensor 11 outputs the sensor signal depending on the heat flux, the value of the sensor signal is zero when no heat flux is generated. For example, in the case of FIGS. 5A to 5C, in which the elastic deformation member 20 is compressed, the temperature of the heat absorbing member 12 is increased and gradually comes closer to the temperature of the elastic deformation member 20 when a compressed condition of the elastic deformation member 20 is continuously maintained. Then, the heat flux passing through the heat flux sensor 11 becomes smaller. Finally, the heat flux passing through the heat flux sensor 11 becomes zero and thereby the sensor signal becomes zero.

For example, in a case that the strain detecting device 1 is mounted to a part being measured (hereinafter, the measuring object), the sensor signal becomes zero after a predetermined time has elapsed even when the elastic deformation member 20 is compressed like FIGS. 5A to 5C. Accordingly, it is not necessary in the strain detecting device 1 of the present embodiment to carry out an offset adjustment each time when (or after) the strain detecting device 1 is mounted to the measuring object.

When the elastic deformation member 20 is compressed, the sensor signal outputted from the sensor portion 10 has a peak value after a predetermined time has elapsed from the compression of the elastic deformation member 20. The sensor signal gradually becomes smaller after teak value timing. When the amplitude of the external force applied to the strain detecting device 1 is measured, the amplitude is calculated, for example, by use of the peak value of the sensor signal.

As above, the strain detecting device 1 of the present embodiment includes the heat flux sensors 11 as the sensor portion 10, and the elastic deformation member 20 is provided so as to cover the heat flux sensors 11. When the strain detecting device 1 is mounted to (or put on) the measuring object, the sensor signal becomes zero after the predetermined time. In other words, it is possible to precisely detect the deformation amount without the offset adjustment when (or after) the strain detecting device 1 mounted to (or put on) the measuring object. Furthermore, the structure of the strain detecting device 1 becomes simpler, because the offset adjustment is not necessary.

In addition, the sensor portion 10 of the strain detecting device includes the first heat flux sensor 11a and the second heat flux sensor 11b, wherein the elastic deformation member 20 is so arranged as to surround the sensor portion 10. As a result, the external force is not directly applied to the sensor portion 10 and thereby it becomes possible to increase resistance to impact.

The strain of the strain detecting device 1 is detected based on the heat fluxes HF1a, HF1b, HF2a and HF2b generated by the deformation of the elastic deformation member 20. In other words, the elastic deformation member 20 has not only a function of protecting sensor portion 10 but also a function as a heat source. When compared the present embodiment with a comparison example, in which a member for protecting the sensor portion and a member for generating the heat flux depending on the strain are independently provided, a number of parts can be made smaller in the present embodiment.

In addition, in the present embodiment, the first sensor surface 110a of the first heat flux sensor 11a and the first sensor surface 110a of the second heat flux sensor 11b are so arranged as to be opposed to each other in the radial direction in the thickness direction of each heat flux sensor) and the heat absorbing member 12 is located at the position between the first and the second heat flux sensors 11a and 11b. According to the above structure, the value of the sensor signal becomes positive when the elastic deformation member 20 is compressed, while the value of the sensor signal becomes negative when the elastic deformation member 20 is expanded. The strain detecting device 1 of the present embodiment can easily detect the condition (the compressed or expanded condition) of the strain detecting device 1 based on the polarity (the positive or negative) of the sensor signal.

The amplitude of the heat flux depends on the deformation amount of the elastic deformation member 20 for the unit time. Namely, the amplitude of the heat flux depends on the amplitude of the external force having influence on the strain detecting device 1. Accordingly, in the strain detecting device 1 of the present embodiment, it is possible to easily detect the amplitude of the external force having influence on the strain detecting device 1 based on the amplitude of the sensor signal (the peak value thereof).

Each of the heat fluxes HF1a, HF1b, HF2a and HF2b depends on the deformation amount of the elastic deformation member 20 for the unit time but does not depend on the ambient temperature. Therefore, it is not necessary in the strain detecting device 1 of the present embodiment to provide a temperature sensor for sensing the ambient temperature, a temperature correcting circuit and so on. It is thereby possible to make the structure of the strain detecting device 1 simpler.

Second Embodiment

A strain detecting device according to a second embodiment will be explained. The second embodiment is different from the first embodiment in the structure of the housing 50 and the elastic deformation member 20. The other parts and portions of the second embodiment are the same to those of the first embodiment and the explanation thereof is omitted.

Figure 7:
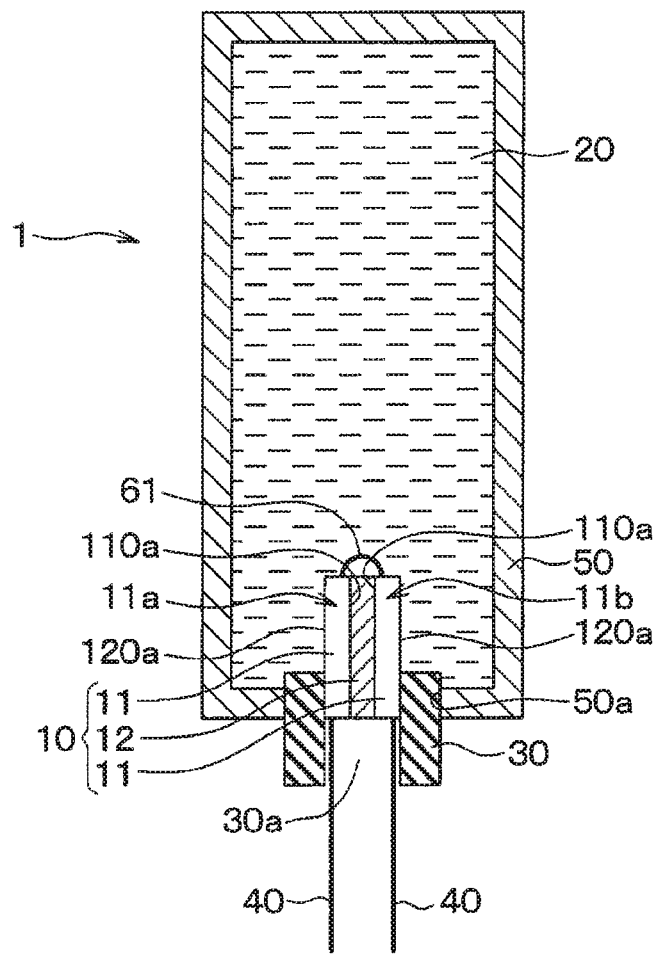
FIG. 7 is a schematic cross sectional views showing a strain detecting device according to a second embodiment or the present disclosure.

As shown in FIG. 7, an opening portion 50a is formed at a lower-side end of the housing 50. The opening portion 50a is closed by the supporting member 30. The housing 50 is formed as a closed container.

The elastic deformation member 20 is composed of such a material having a flow-ability, such as, grease. The housing 50 is filled with such elastic deformation material.

The sensor portion 10 includes the first heat flux sensor 11a, the second heat flux sensor 11b and the heat absorbing member 12, each planar shape of which has a size smaller than that of the first embodiment.

As explained above, in the strain detecting device 1 of the present embodiment, the elastic deformation member 20 is made of the material having the flow-ability. When the external force is applied to the housing 50 in order to compress the elastic deformation member 20, it is not always necessary to compress a fixed point of the housing 50. In other words, when the external force is applied to any point of the housing 50, the elastic deformation member 20 is compressed by Pascal's principle. For example, when the first portion of the elastic deformation member 20 covering the first heat flux sensor 11a is compressed, the second portion of the Plastic deformation member 20 covering the second heat flux sensor 11b is likewise compressed. As a result, the elastic deformation members 20 at both sides of the first and the second heat flux sensors 11a and 11b are compressed like the condition of FIG. 5C. On the other hand, when the strain detecting device 1 is released from the external force, the elastic deformation members 20 at both sides of the first and the second heat flux sensors 11a and 11b are expanded like the condition of FIG. 6C. The detection accuracy is thereby increased.

In the strain detecting device 1 of the present embodiment, since each and every portion of the elastic deformation member 20 is uniformly compressed, the planar shape of the first heat flux sensor 11a and the planar shape of the second heat flux sensor 11b can be made smaller. It is thereby possible to reduce the material for the first and the second heat flux sensors 11a and 11b.

As above, in the present embodiment, the elastic deformation member 20 is made of the material having the flow-ability, such as, grease. However, the elastic deformation member 20 is made of such fluid having high flow-ability. According to such a structure, a difference of a compressed amount at each point of the elastic deformation member 20 becomes smaller, to thereby further improve the detection accuracy.

Third Embodiment

A third embodiment of the present disclosure will be explained. In the present embodiment, a diagnosing device 80 is constructed by the strain detecting device 1 of the first embodiment for diagnosing a fastening condition of a fastener unit 70.

Figure 8:
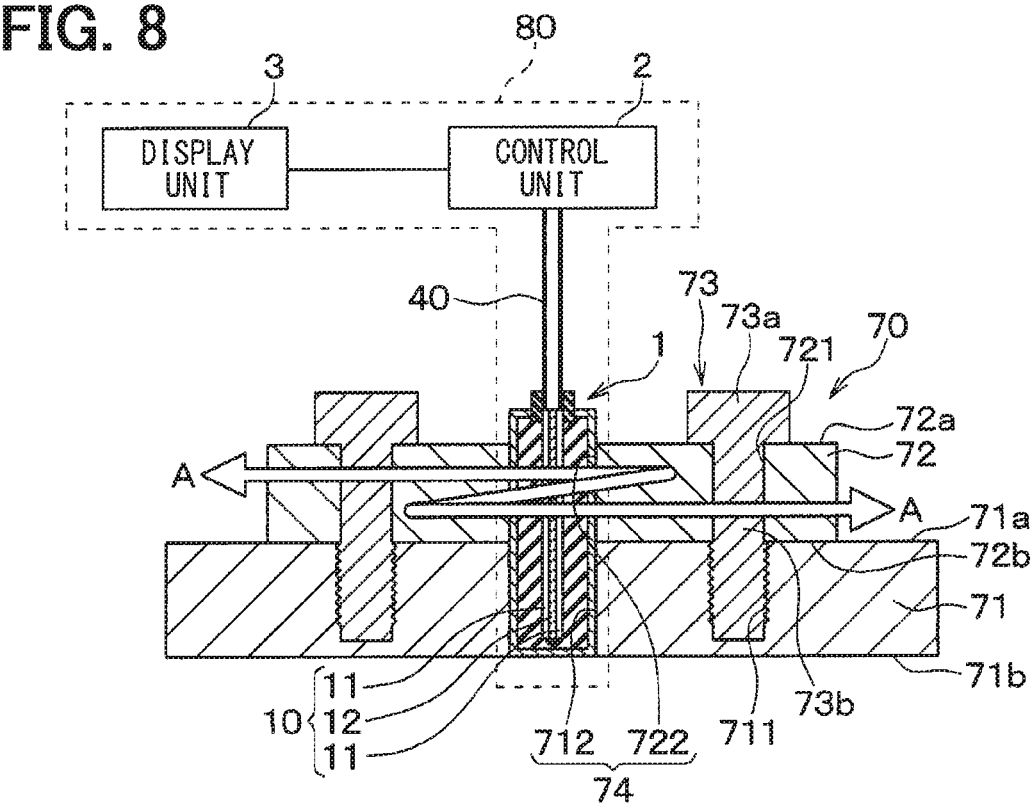
FIG. 8 is a schematic cross sectional view showing a diagnosing device and a fastener unit according to a third embodiment of the present disclosure.
Figure 9:
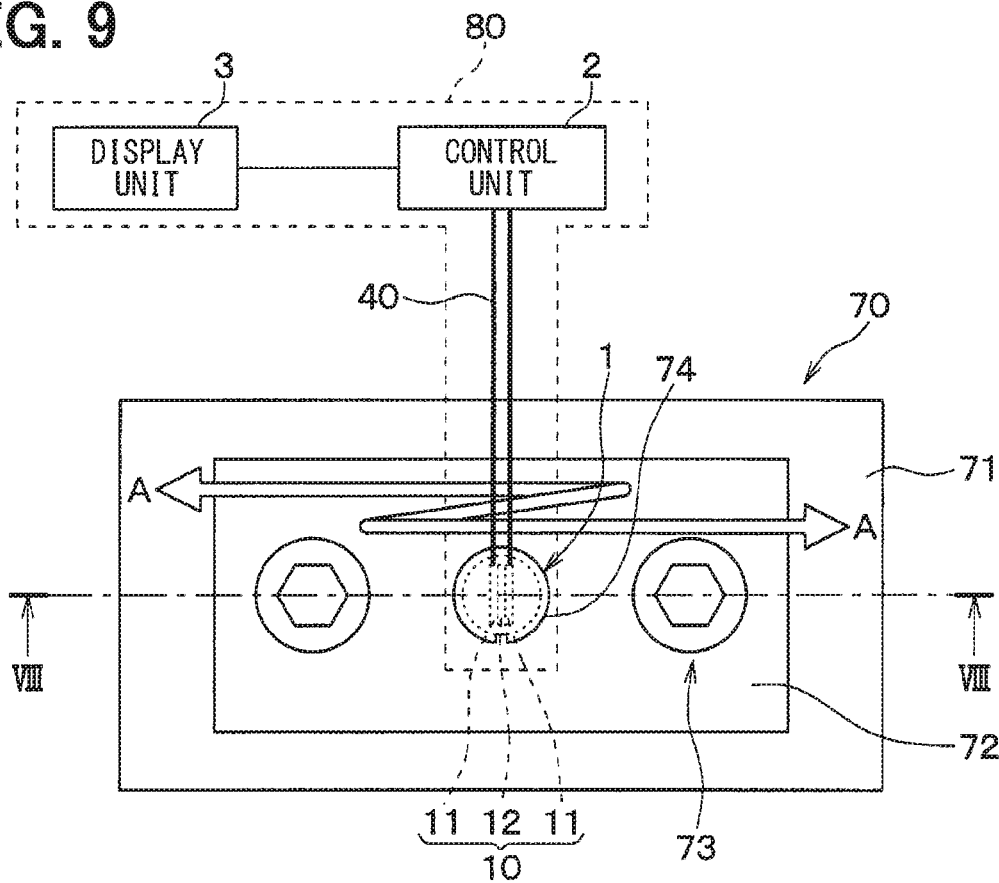
FIG. 9 is a schematic top plane view showing the diagnosing device and the fastener unit according to the third embodiment of the present disclosure.

The diagnosing device 80 of the present embodiment diagnoses the fastening condition of the fastener unit 70, in which a first fastener element and a second fastener element are connected to each other. The fastener unit 70 of the present embodiment includes a first base portion 71 as the first fastener member, a second base portion 72 as the second fastener member and bolts 73 as fastening members, as shown in FIGS. 8 and 9. The fastener unit 70 of FIG. 8 is a cross section taken along a line VIII-VIII in FIG. 9.

The first base portion 71 made of metal, for example, SUS303, has a first front-side surface 71a and a first rear-side surface 71b, which is on an opposite side to the first front-side surface 71a in an axial direction of the fastener unit 70. Bolt insertion holes 711 are formed in the first base portion 71, so that each of the bolts 73 is inserted into each of the bolt insertion holes 711 in an axial-downward direction from the first front-side surface 71d. A screw groove is formed at an inner peripheral wall of the bolt insertion hole 711. A detection-device accommodation hole 712 is further formed in the first base portion 71, so that the strain detecting device 1 is inserted into the detection-device accommodation hole 712.

In a similar manner, the second base portion 72 made of metal, for example, SUS303, has a second front-side surface 72a and a second rear-side surface 72b, which is on an opposite side to the second front-side surface 72a in the axial direction. Through-holes 721 are formed in the second base portion 72 so as to pass through the second base portion 72 in the axial direction from the second front-side surface 72a to the second rear-side surface 72b. Each of the bolts 73 is inserted through the through-hole 721. A detection-device insertion hole 722 is further formed in the second base portion 72, so that the strain detecting device 1 is inserted through the detection-device insertion hole 722.

For example, a moving unit (not shown) of a robot device is fixed to the second base portion 72 in the present embodiment. The second base portion 72 works as a flange portion of the robot device.

Each of the bolts 73 is made of the metal, for example, stainless and has a head portion 73a and a shaft portion 73b. The head portion 73a is in contact with the second front-side surface 72a of the second base portion 72. The shaft portion 73b s inserted into the bolt insertion hole 711 via the through-hole 721. A screw groove is formed at an outer peripheral wall of the shaft portion 73b, so that the screw groove of the bolt 73 is engaged with the screw groove of the bolt insertion hole 711.

The second base portion 72 is placed on the first front-side surface 71a of the first base portion 71 and firmly fixed to the first base portion 71 by the bolts 73. More exactly, the second rear-side surface 72b of the second base portion 72 is opposed to and in contact with the first front-side surface 71a of the first base portion 71 in the axial direction, so that each of the bolt insertion holes 711 and each of the through-holes 721 are communicated to each other and the detection-device accommodation hole 712 and the detection-device insertion hole 722 are communicated to each other. Each of the bolts 73 is inserted into the bolt insertion hole 711 via the through-hole 721 and the screw groove of the bolt 73 and the screw groove of the bolt insertion hole 711 are engaged with each other, so that the second base portion 72 is firmly fixed to the first base portion 71.

Although not shown in the drawings, the first rear-side surface 71b of the first base portion 71 is firmly fixed to a table or a seating face. In the present embodiment, the detection-device accommodation hole 712 of the first base portion 71 and the detection-device insertion hole 722 of the second base portion 72 are collectively referred to a sensor insertion hole 74. Therefore, the sensor insertion hole 74 is formed in the fastener unit 70 in such a way that the sensor insertion hole 74 extends in the axial direction from the second base portion 72 to the first base portion 71.

The diagnosing device 80 includes the strain detecting device 1, a control unit 2 and a display unit 3.

The strain detecting device 1 has the structure identical to that of the first embodiment. The strain detecting device 1 is inserted into and supported by the sensor insertion hole 74 formed in the fastener unit 70. Since the strain detecting device 1 has the housing 50 made of the spring pin, the restoring force is generated in the housing 50 (the spring pin) when the strain detecting device 1 is press inserted into the sensor insertion hole 74. The strain detecting device 1 is supported by the sensor insertion hole 74 by the restoring force of the housing 50.

The moving unit of the robot device fixed to the second base portion 72 moves in a direction indicated by an arrow A (hereinafter, the moving direction), as shown in FIGS. 8 and 9. The strain detecting device 1 is inserted into the sensor insertion hole 74 in such a way that a surface direction of the heat flux sensor 11 of the sensor portion 10 (that is, a direction of the first or the second sensor surface 110a or 120a) intersects with the moving direction A of the moving unit of the robot device at a right angle (90 degrees).

In other words, the strain detecting device 1 is inserted into the sensor insertion hole 74 in such a way that the sensor-surface opposing portion of the elastic deformation member 20 covering the heat flux sensor 11 is easily deformed when the moving unit of the robot device is moved. The sensor-surface opposing portion is a portion of the elastic deformation member 20, which is located at a position opposing to the first or the second sensor surface in a direction perpendicular thereto. According to the above structure, when the second base portion 72 is moved in the moving direction A, the condition of the strain detecting device 1 is repeatedly changed from the condition of FIG. 5A to the condition of FIG. 6A, the condition of FIG. 5B and the condition of FIG. 6B. As a result, it is possible to precisely detect the external force applied to the strain detecting device 1.

The control unit 2 includes CPU (Central Processing Unit), RAM (Random Access Memory), ROM (Read Only Memory), flash memory devices and so on. The CPU of the control unit 2 carries out programs memorized in the ROM and the flash memory devices and uses the RAM as a working area when carrying out the programs. The control unit 2 realizes the function memorized in the programs by the operation of the CPU. The RAM, ROM and the flash memory devices are non-transitional and substantive storage media.

The control unit 2 is connected to the sensor portion 10 of the strain detecting device 1 via the wring members 40 so that the sensor signal is inputted from the sensor portion 10 to the control unit 2. The control unit 2 diagnoses the fastening condition of the fastener unit 70 based on the sensor signal. In the present embodiment, as explained below, the control unit 2 compares the sensor signal with a predetermined threshold value and determines that the fastening condition of the fastener unit 70 is not in a good condition when the sensor signal is larger than the threshold value. The control unit 2 outputs an abnormal control signal to the display unit 3, when it determines that there is an abnormal condition in the fastening condition of the fastener unit 70. The threshold value corresponds to a determination parameter.

The display unit 3 includes a liquid crystal display or the like. The display unit 3 displays a screen image or the like for the abnormal condition of the fastener unit 70, when it receives the abnormal control signal from the control unit 2.

An operation of the diagnosing device 80 having the above structure will be explained.

When the external force is applied to at least any one of the first base portion 71, the second base portion 72 and the bolts 73, such external force is transmitted to the strain detecting device 1. In the present embodiment, the moving unit of the robot device fixed to the second base portion 72. Therefore, when the moving unit of the robot device is moved, the external force corresponding to such movement of the moving unit is applied to the strain detecting device 1 or the external force is released from the strain detecting device 1.

When the external force is applied to or released from the strain detecting device 1, the elastic deformation member 20 is compressed or expanded. The strain detecting device 1 outputs the sensor signal depending on the external force. The control unit 2 compares the sensor signal with the threshold value in order to diagnose the fastening condition of the fastener unit 70.

More exactly, when the external force is applied to the fastener unit 70 in a condition that the bolts 73 slacken, the external force applied to the strain detecting device 1 becomes larger while the external force applied to the bolts 73 becomes smaller. In this case, the amount of compression for the elastic deformation member 20 for the unit time becomes larger. In other words, the first heat-generation heat flux HF1a or the second heat-generation heat flux HF1b becomes larger. As a result, the value of the sensor signal outputted from the strain detecting device 1 becomes larger.

Figure 10:
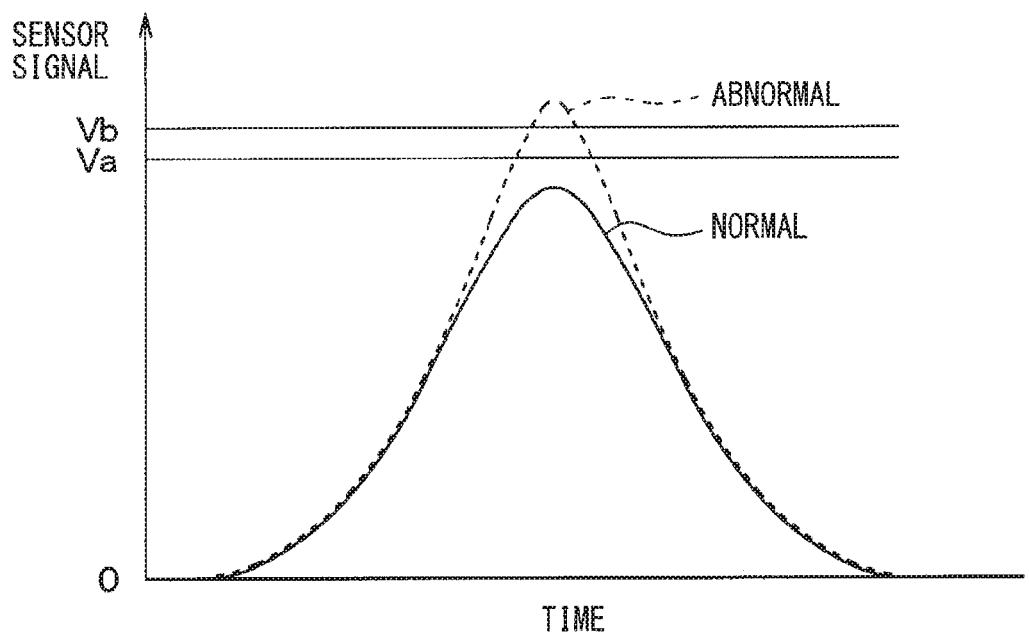
FIG. 10 is a graph showing a relationship between a sensor signal and a threshold value, when external force is applied to the strain detecting device.

The control unit 2 determines whether the sensor signal is larger than the threshold value or not, in order to diagnose whether the fastening condition of the fastener unit 70 is in the abnormal condition or not. As shown in FIG. 10, a first threshold value Va and a second threshold value Vb are set as each of the threshold values, wherein the second threshold value Vb is larger than the first threshold value Va. The first threshold value Va corresponds to the threshold value for a case in which the bolts 73 are about to slacken, while the second threshold value Vb corresponds to the threshold value for a case in which the bolts 73 have slackened. Therefore, when the sensor signal is larger than the second threshold value Vb, it is generally necessary to check the fastening condition of the fastener unit 70.

The control unit 2 determines whether the sensor signal is larger than the first threshold value Va or not. The control unit 2 further determines whether the sensor signal is larger than the second threshold value Vb or not, when the sensor signal is larger than the first threshold value Va. Then, the control unit 2 outputs the abnormal control signal to the display unit 3 so as to display a message for prompting an operator to check the fastener unit 70, when the sensor signal is larger than the first threshold value Va. In addition, the control unit 2 outputs the abnormal control signal to the display unit 3 so as to display a warning for urging the operator to check the fastener unit 70, when the sensor signal is larger than the second threshold value Vb. As above, the operator can get information about the abnormal condition of the fastener unit 70 and take a necessary measure, for example, to retighten the bolts 73 of the fastener unit 70.

Each of the threshold values Va and Vb is set based on the sensor signals obtained when the fastening condition of the fastener unit 70 is in the normal condition. More exactly, each of the threshold values Va and Vb is set based on the amount of the compression of the elastic deformation member 20 after the strain detecting device 1 is fixed to the fastener unit 70. It is thereby possible to more precisely detect the external force applied to the strain detecting device 1. In other words, since each of the threshold values Va and Vb is decided after the initial compression amount of the elastic deformation member 20 is fixed, the detection accuracy can be further improved. However, each of the threshold values Va and Vb may be set in advance before the strain detecting device 1 is fixed to the fastener unit 70.

As above, it is possible to provide the diagnosing device 80 by use of the strain detecting device 1 in order to diagnose the fastening condition of the fastener unit 70. The diagnosing device 80 is realized by the following steps:

i) to form the sensor insertion hole 74 in the existing fastener unit 70;

ii) to locate the strain detecting device 1 in the sensor insertion hole 74; and iii) to separately provide the control unit 2 and the display unit 3.

Accordingly, it is possible to easily apply the diagnosing device 80 to the existing fastener unit 70.

The strain detecting device 1 is located in the sensor insertion hole 74 in such a way or at such a position that the sensor-surface opposing portion of the elastic deformation member 20 covering the heat flux sensor 11 is more easily and surely deformed. It is thereby possible to improve diagnosing accuracy of the diagnosing device 80.

In the present embodiment, the structure and function of the diagnosing device 80 for diagnosing the fastening condition of the fastener unit 70 are explained. The structure of the present embodiment can be so regarded as the structure of the fastener unit 70 having the diagnosing device 80.

Fourth Embodiment

A fourth embodiment will be explained. In the present embodiment, the diagnosing device 80 is constructed by use of the strain detecting device 1 for diagnosing a holding condition of a holding unit 90.

Figure 11:
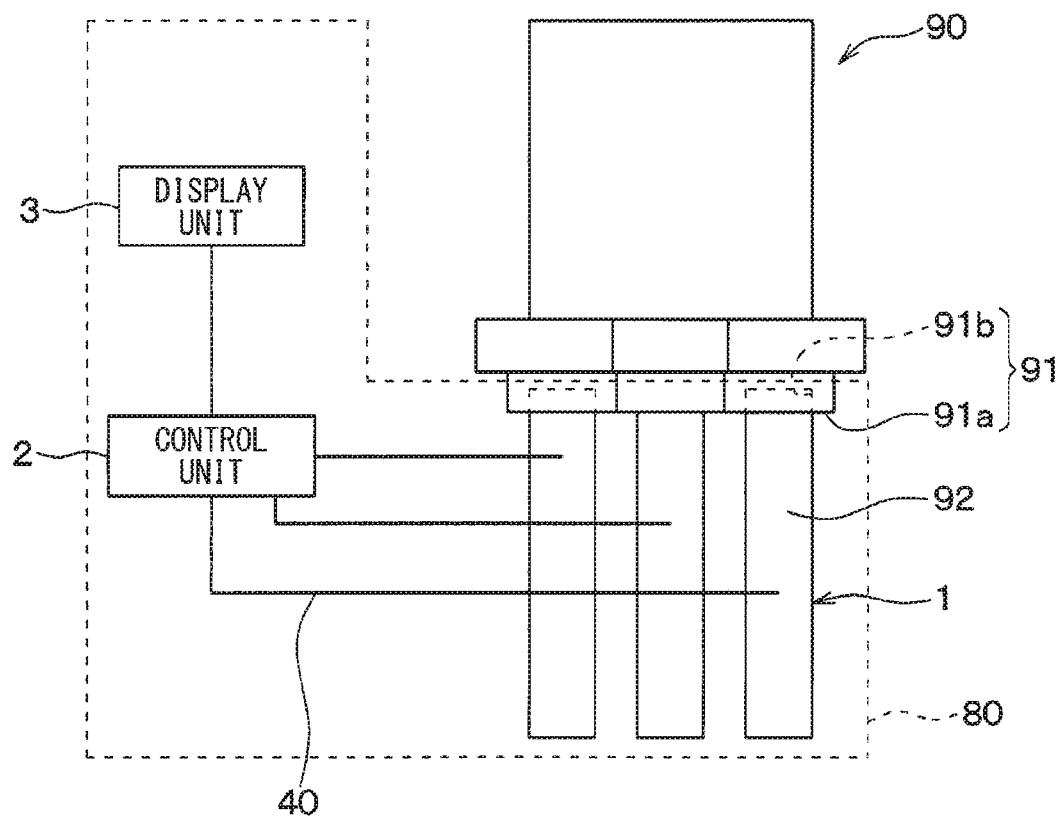
FIG. 11 is a schematic front view showing a diagnosing device and a holding unit according to a fourth embodiment of the present disclosure.
Figure 12:
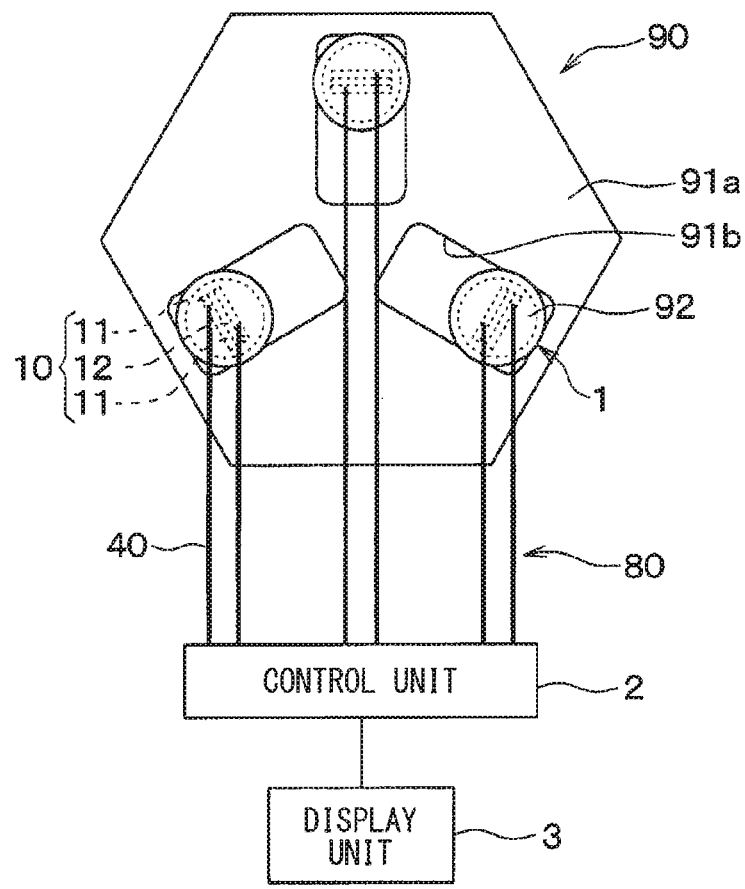
FIG. 12 is a schematic top plane view showing the diagnosing device and the holding unit accordion to the fourth embodiment of the present disclosure.

The diagnosing device 80 of the present embodiment diagnoses the holding condition of the holding unit 90 for holding a holding-subject object (hereinafter, the holding object). As shown in FIGS. 11 and 12 the holding unit 90 of the present embodiment includes a base portion 91 and three arm portions 92, each of which is movably supported by the base portion 91. The holding unit 90 is a three-claw chuck.

The base portion 91 is made of metal, such as, SUS 303. The base portion 91 includes a front-side surface 91a and three guide grooves 91b formed on the front-side surface 91a. Each of the guide grooves 91b extends in a radial direction of the base portion 91 from a center neighboring portion to an outer periphery of the front-side surface 91a. The three guide grooves 91b are arranged in a circumferential direction of the front-side surface 91a at equal intervals. In other words, respective center angles formed between the neighboring guide grooves 91b are identical to one another.

Each of the arm portions 92 is inserted into the respective guide groove 91b in an axial direction from the front-side surface 91a to a rear-side of the base portion 91. Each of the arm portions 92 is supported by the base portion 91 so as to be movable along the guide groove 91b. Therefore, each of the arm portions 92 is movable in the radial direction between the center neighboring portion and the outer periphery of the front-side surface 91a. In the present embodiment, each of the arm portions 92 is composed of the strain detecting device 1 of the above first or second embodiment. The arm portions 92 correspond to a holding portion.

The holding unit 90 of the present embodiment has the above explained structure. As indicated by an arrow B in FIG. 13, each of the arm portions 92 is moved in the radial direction along the guide groove 91b. When each of the arm portions 92 is brought into contact with the holding object W, the holding object W is gripped and held by the arm portions 92.

As shown in FIGS. 11 and 12, the diagnosing device 80 of the present embodiment includes the strain detecting device 1, the control unit 2 and the display unit 3.

Figure 13:
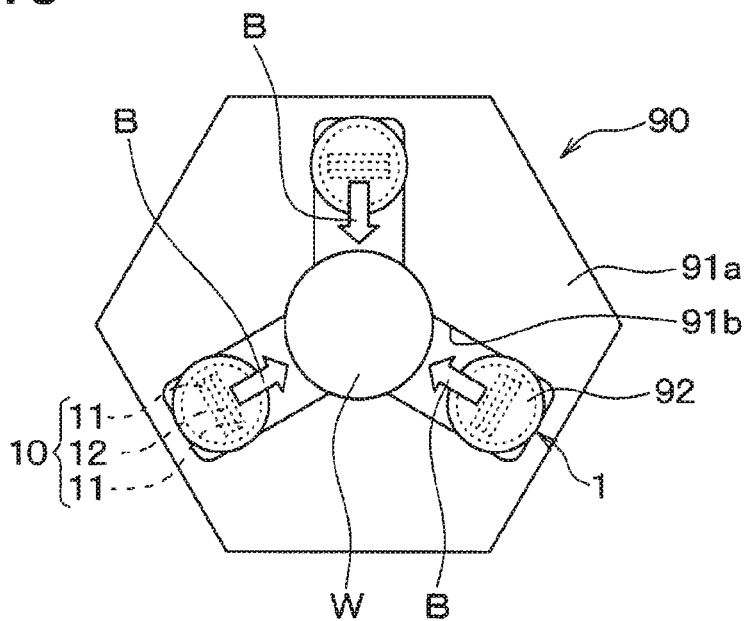
FIG. 13 is a schematic top plane view showing the holding unit, in which a holding object is gripped by the holding unit.

The strain detecting device 1, which has the same structure to that of the first embodiment, is used as the arm portion 92. As shown in FIG. 13, a radial-inside portion of the arm portion 92 located on a side closer to the center of the front-side surface 91a of the base portion 91 is in contact with the holding object Vito grip and hold the holding object W. In other words, a reactive force is applied as the external force to the radial-inside portion of the arm portion 92. In the present embodiment, the arm portion 92 (that is, the strain detecting device 1) is arranged in the base portion 91 in such a manner that the surface direction of the heat flux sensor 11 of the sensor portion 10 intersects with the radial direction, in which the arm portion 92 is movable. In other words, the arm portion 92 (the strain detecting device 1) is arranged in the base portion 91 in such a manner that the sensor-surface opposing portion of the elastic deformation member 20 covering the heat flux sensor 11 is more easily and surely deformed when it is brought into contact with the holding object W.

Each of the control unit 2 and the display unit 3 has a structure, which is basically the same to that of the control unit 2 and the display unit 3 of the third embodiment. In the present embodiment, however, the control unit 2 determines that the holding condition of the holding unit 90 is in an abnormal condition, when the sensor signal is smaller than a predetermined threshold value, as explained below more in detail. The predetermined threshold value corresponds to the determination parameter.

The diagnosing device 80 has the above explained structure. An operation of the diagnosing device 80 will be hereinafter explained.

In the above holding unit 90, each of the arm portions 92 is brought into contact with the holding object W so as to grip and hold the same. The reactive force is thereby applied to each of the arm portions 92 as the external force. Since the arm portion 92 is constructed by the strain detecting device 1, the elastic deformation member 20 is compressed when the arm portion 92 is brought into contact with the holding object W or the elastic deformation member 20 is expanded when the arm portion 92 is separated from the holding object W. As a result, the strain detecting device 1 of the arm portion 92 outputs the sensor signal depending on the holding condition of the arm portion 92. The control unit 2 compares the sensor signal with the predetermined threshold value in order to determine whether or not there is the abnormal condition in the holding condition of the arm portion 92.

More exactly, in a case that any one of the arm portions 92 is not properly in contact with the holding object W, the reactive force to be applied to such arm portion 92 becomes smaller. Namely, in the strain detecting device 1 of the arm portion 92 which is not properly in contact with the holding object W, the compression amount of the elastic deformation member 20 per unit time becomes smaller. In other words, the first heat-generation heat flux HF1a or the second heat-generation heat flux HF1b becomes smaller in the strain detecting device 1 of the arm portion 92 which is not properly in contact with the holding object W. As a result, the sensor signal outputted from the strain detecting device 1 becomes smaller.

Figure 14:
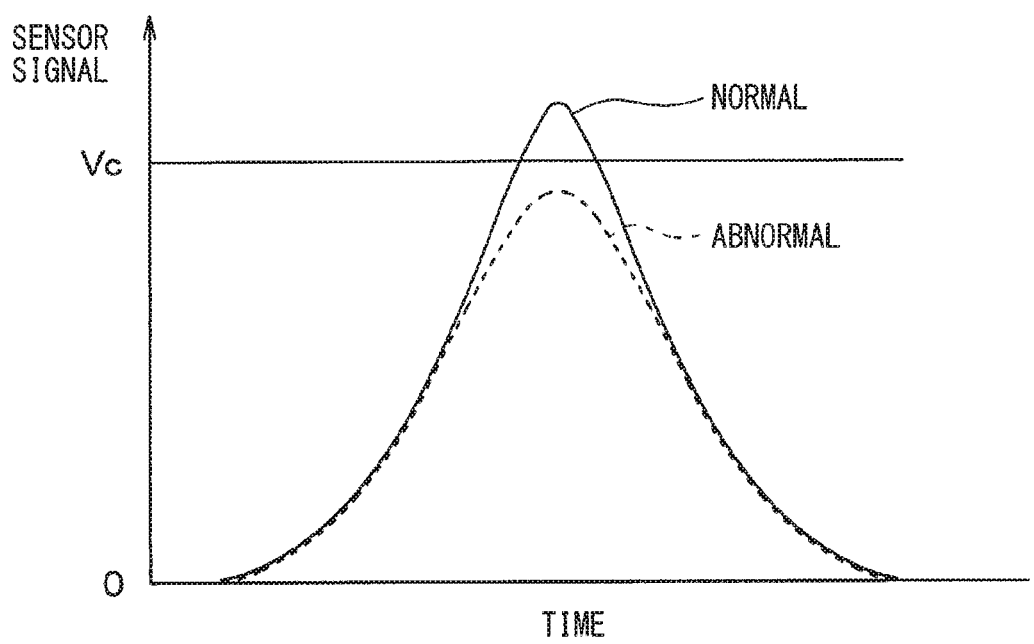
FIG. 14 is a graph showing a relationship between the sensor signal and a threshold value, when the holding object is gripped by the holding unit.

The control unit 2 compares the sensor signal with the predetermined threshold value in order to determine whether the holding condition of the holding unit 90 is in the abnormal condition or not. As shown in FIG. 14, the control unit 2 determines whether the sensor signal is larger than the threshold value VC or not. When any one of the sensor signals from the strain detecting devices 1 is smaller than the threshold value Vc, the control unit 2 determines that the holding condition of the holding unit 90 is in the abnormal condition. The control unit 2 outputs the abnormal control signal to the display unit 3 in order to display that the holding object W is not properly gripped and held by the arm portions 92. The operator of the holding unit 90 can get the information that the holding object W is not properly gripped and held by the arm portions 92 and can take a necessary measure, for example, to replace the arm portion 92 of the abnormal condition with a non-defective arm portion.

The determination of the control unit 2 whether the holding condition is in the abnormal condition or not is equal to the determination whether the holding object W is properly gripped and held by the holding unit 90. The threshold value Vc is set based on the sensor signal, which is obtained when the holding condition of the holding unit 90 is in the normal condition. Namely, the threshold value Vc is decided based on the compression amount of the elastic deformation member 20 after the strain detecting device 1 is assembled to the holding unit 90. Accordingly, it is possible to further increase the detection accuracy. In other words, since the threshold value Vc is decided after the initial compression amount of the elastic deformation member 20 has been fixed, the detection accuracy can be improved. The threshold value Vc, however, may be decided in advance before the strain detecting device 1 is assembled to the holding unit 90.

As above, it is possible to provide the diagnosing device 80 by use of the strain detecting device 1 in order to diagnose the holding condition of the holding unit 90. The diagnosing device 80 is realized by the following steps:

i) to form the arm portion 92 of the existing holding unit 90 by the strain detecting device 1; and ii) to separately provide the control unit 2 and the display unit 3.

Accordingly, it is possible to easily apply the diagnosing device 80 to the existing holding unit 90.

The strain detecting device 1 is located in the base portion 91 in such a way that the sensor-surface opposing portion of the elastic deformation member 20 covering the heat flux sensor 11 is more easily and surely deformed. It is thereby possible to improve the diagnosing accuracy of the diagnosing device 80.

In the present embodiment, the structure and function of the diagnosing device 80 for diagnosing the holding condition of the holding unit 90 are explained. The structure of the present embodiment can be so regarded as the structure of the holding unit 90 having the diagnosing device 80.

Further Embodiments and/or Modifications

The present disclosure is not limited to the above embodiments but can be further modified in various manners without departing from a spirit of the present disclosure.

(M1) For example, in the above embodiments, the first heat flux sensor 11a and the second heat flux sensor 11b may be integrally formed as one unit. More exactly, one heat flux sensor is folded back in such a way that one of sensor surfaces (for example, the first sensor surface 110a) is opposed to each other.

(M2) In the above embodiments, the first heat flux sensor 11a and the second heat flux sensor 11b may be so modified that the second sensor surfaces 120a are opposed to each other. In such a modification, when the external force is applied to the strain detecting device 1, the sensor signal becomes the negative value. When the external force is released from the strain detecting device 1, the sensor signal becomes the positive value. In the case of this modification, the polarity of the threshold value is correspondingly changed in the above third and the fourth embodiments.

(M3) In the above embodiments, it is not always necessary that the first and the second heat flux sensors 11a and 11b are connected in series to each other in other words, the first heat flux sensor 11a and the second heat flux sensor 11b may be connected in parallel to each other in the above third or the fourth embodiment. In this modification, the control unit 2 calculates a sum of the sensor signals from the first and the second heat flux sensors 11a and 11b and carries out, the diagnosing process by use of the sum of the sensor signals.

(M4) In the heat flux sensor 11 of the above embodiments, each of the insulating substrate 100, the front-side protecting member 110 and the rear-side protecting member 120 may be made of flexible insulating material other than the resin. In addition, the heat flux sensor 11 may have such a structure, in which the front-side protecting member 110 and the rear-side protecting member 120 are not provided. Furthermore, the heat flux sensor 11 may have any other structure different from that of the above embodiments, so long as the heat flux sensor detects the heat flux.

(M5) In the first, the third and the fourth embodiments, the housing 50 may be hermetically sealed like the second embodiment. In such a hermetically-sealed housing 50, the elastic deformation member 20 may be made of resin or rubber which is injection molded into the housing 50 in a condition that the sensor portion 10 is located in the housing 50. When the elastic deformation member 20 is made by the injection molding process, the housing 50 is in an expanded condition due to the pressure in the housing 50. The elastic deformation member 20 is in a compressed condition by a restoring force of the housing 50 after the injection molding process. Namely, the elastic deformation member 20 is in the compressed condition in an initial stage. The constant of spring for the elastic deformation member 20 is thereby increased. The heat generation amount as well as the heat absorbing amount is increased, when the external force is applied to or released from the strain detecting device 1. A detection range can be thereby increased. Alternatively, in the first, the third or the fourth embodiment, the elastic deformation member 20 may be so provided in the housing 50 that a compressing force is applied from the housing 50 to the elastic deformation member 20. Even in such an alternative modification, the same advantages can be obtained.

(M6) In the above third and the fourth embodiments, the voltage is used as the sensor signal. However, the voltage may be converted into current in order to carry out the determination for the abnormal condition.

(M7) In the above first, the third and the fourth embodiments, it is not always necessary to provide the housing 50. For example, in the third embodiment, the elastic deformation member 20 may be directly in contact with the inner peripheral wall of the sensor insertion hole 74.

(M8) in the above fourth embodiment, the diagnosing device 80 determines that the holding condition of the holding unit 90 is in the abnormal condition when the sensor signal becomes smaller than the threshold value. However, the fourth embodiment may be modified in the following manner. When one of the arm portions 92 is not properly in contact with the holding object W, the reactive force to be applied from the holding object W to the remaining two arm portions 92 becomes larger. Therefore, the diagnosing device 80 may determine whether the sensor signal from the remaining arm portions 92 is larger than a predetermined value, in order to diagnose the holding condition of the holding unit 90.

(M9) In the above third and the fourth embodiments, the control unit 2 carries out the diagnosing process when the sensor signal has the positive value. In other words, in the above third and the fourth embodiments, the control unit 2 carries out the diagnosing process when the external force is applied to the strain detecting device 1. However, the control unit 2 may carryout the diagnosing process when the sensor signal has the negative value. Namely, the control unit 2 may carry out the diagnosing process when the external force applied to the strain detecting devices released therefrom. In such a modifcation, the polarity of the threshold value is correspondingly changed.

(M10) In the above third embodiment, the control unit 2 determines whether the sensor signal is larger than the first threshold value Va and the second threshold value Vb. However, the control unit 2 may carry out the determination by the comparison of the sensor signal with not two threshold values but one threshold value. Alternatively, the control unit 2 of the above fourth embodiment may compare the sensor signal with not one but two threshold values.

(M11) In the third and the fourth embodiments, the control unit 2 carries out the diagnosing process by comparing the sensor signal with the threshold value. However, the control unit 2 may carry out the diagnosing process in a different way. For example, the control unit 2 calculates a peak width (an amplitude) of the sensor signal and compares the peak width with a predetermined width (a threshold value). The peak width is a difference between a maximum value of the positive sensor signal and a minimum value of the negative sensor signal. In this modification, the predetermined width corresponds to the determination parameter.

Figure 15:
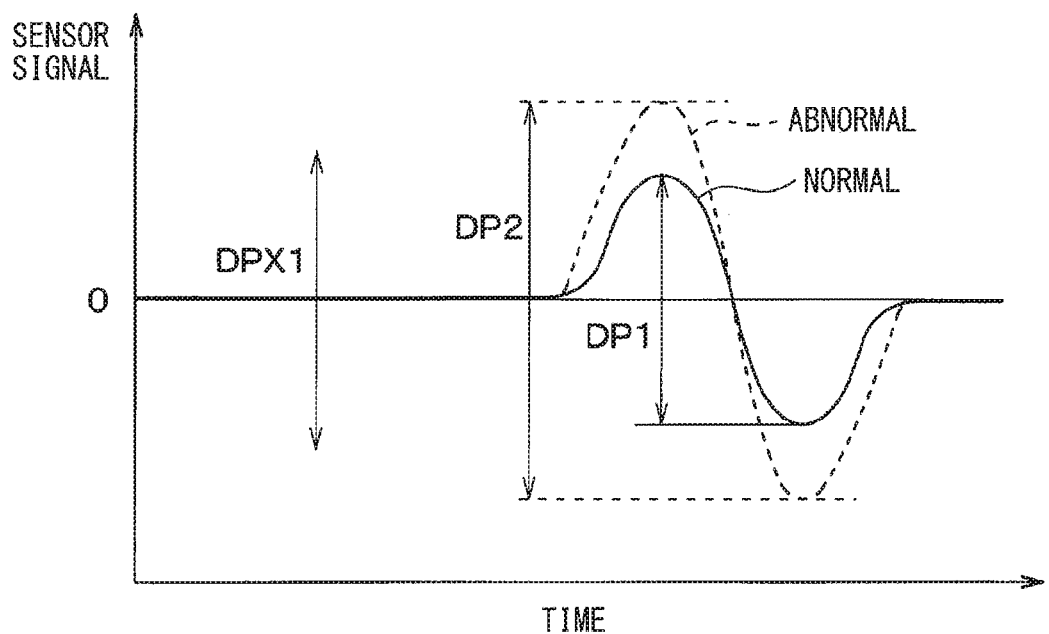
FIG. 15 is a graph showing a relationship between a sensor signal and a threshold value according to a modification of the present disclosure.

For example, in the third embodiment, the external force applied to the strain detecting device 1 becomes larger when the bolts 73 slacken. When the compression amount or the expansion amount of the elastic deformation member 20 for the unit time becomes larger, the peak width of the sensor signal correspondingly becomes larger. As shown in FIG. 15, the control unit 2 determines that the fastening condition of the fastener unit 70 is in the normal condition when the peak width DP1 of the sensor signal is smaller than a predetermined width DPX1. The control unit 2 determines that the fastening condition is in the abnormal condition, when the sensor signal has the peak with DP2 larger than the predetermined width DPX1.

Figure 16:
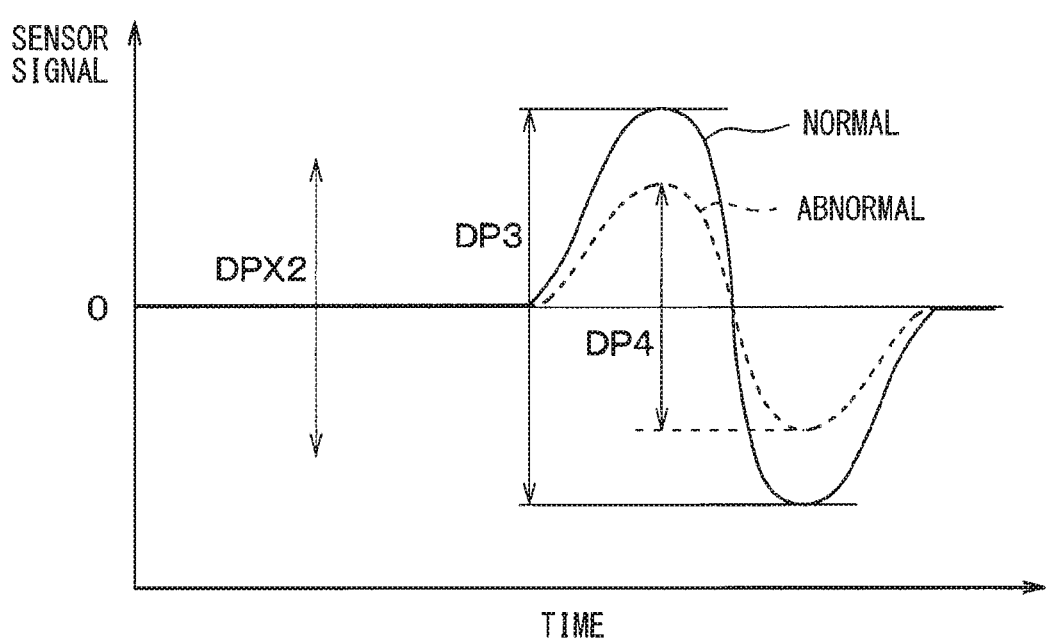
FIG. 16 is a graph showing a relationship between a sensor signal and a threshold value according to another modification of the present disclosure.

In the case of the fourth embodiment, the external force applied to the arm portion 92 becomes smaller when the holding object W is not properly in contact with the arm portions 92. In the arm portion 92 not properly in contact with the holding object W, the compression amount or the expansion amount of the elastic deformation member 20 for the unit time becomes smaller, and thereby the peak width becomes smaller. As shown in FIG. 16, the control unit 2 determines that the holding condition of the holding unit 90 is in the normal condition when the peak width DP3 of the sensor signal is larger than a predetermined width DPX2. On the other hand, the control unit 2 determines that the holding condition is in the abnormal condition, when the sensor signal has the peak with DP4 smaller than the predetermined width DPX2.

(M12) In addition, the control unit 2 of the third or the fourth embodiment may determine that the fastening condition or the holding condition is in the abnormal condition, when the control unit 2 compares a waveform of the sensor signal with a predetermined waveform and a total misalignment between the sensor signal and the predetermined waveform is larger than a predetermined value (for example, several ten percent). Alternatively, the control unit 2 may prepare a predetermined waveform based on the sensor signals from the multiple sensors, which are operating in the normal condition. Then, the control unit 2 determines that the fastening condition or the holding condition is in the normal condition when the sensor signal is within a range of "3σ" of the predetermined waveform.

(M13) in the third embodiment, the moving unit of the robot device is fixed to the second base portion 72. However, the moving unit may be fixed to the first base portion 71. In such a modified fastener unit, the external force is applied to the strain detecting device 1 in the same manner to that of the third embodiment. A method for diagnosing the fastening condition of the third embodiment can be applied to the modification, as it is.

(M14) In the fourth embodiment, the control unit 2 diagnoses the holding condition of the holding unit 90, that is, whether the holding unit 90 properly holds the holding object W or not. However, the diagnosing process may be modified in the following manner. When the holding unit 90 continuously holds the holding object W for a predetermined time, a temperature difference between the elastic deformation member 20 and the heat absorbing member 12 becomes zero. Therefore, the sensor signal from the strain detecting device 1 becomes zero. When the holding object W drops down from the holding unit 90 or when the holding object W hits any other parts, the external force applied to the strain detecting device 1 is changed. Then, the sensor signal is changed to any other than zero. It is, therefore, possible to diagnose whether the holding unit 90 is keeping the proper holding condition of the holding object W or not, by determining whether the sensor signal is zero or not after the holding unit 90 has held the holding object W and the sensor signal has become zero.

In the above modification (M14), since the control unit 2 determines whether the sensor signal is zero or not, zero corresponds to the determination parameter. Even in a case that the holding unit 90 continuously holds the holding object W in the proper manner, the sensor signal having a small value may be outputted. It therefore, preferable that a predetermined range around zero is set as the threshold value and the control unit 2 determines whether the holding object N is properly held or not by comparing the sensor signal with the predetermined range. Namely, the control unit 2 determines that the holding unit 90 properly holds the holding object W when the sensor signal is within the predetermined range. It is thereby possible to increase sensitivity for the determination of the abnormal condition, because the sensor signal becomes zero when the holding unit 90 properly holds the holding object W.

(M15) In the strain detecting device 1 of the first embodiment, the detection sensitivity may be changed depending on the material for the elastic deformation member 20 or depending on a position of the elastic deformation member 20 which is mainly deformed by the external force. For example, the detection sensitivity in the case that the portion of the elastic deformation member 20 not directly covering or opposing to the sensor surface of the first and the second heat flux sensors 11a and 11b is deformed may become smaller than the detection sensitivity in the case that the sensor-surface opposing portion of the elastic deformation member 20 directly covering and opposing to the sensor surface of the first and the second heat flux sensors 11a and 11b is deformed.

Figure 17:
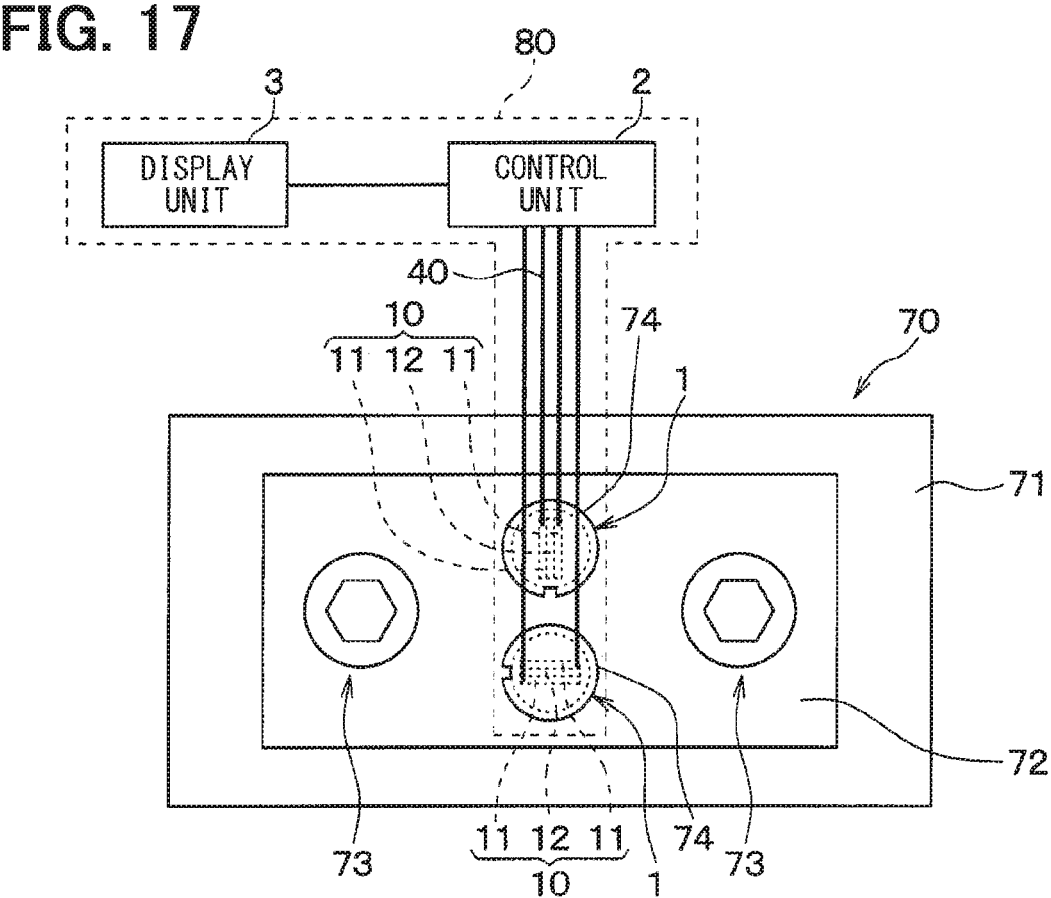
FIG. 17 is a schematic top plane view showing a diagnosing device and a fastener unit according to a further modification of the present disclosure.

As shown in FIG. 17, the third embodiment may be so modified that the diagnosing device 80 has two strain detecting devices 1 provided in the fastener unit 70. More exactly, the surface direction of the heat flux sensor 11 of a first strain detecting device 1 intersects with the surface direction of the heat flux sensor 11 of a second strain detecting device 1. According to such a modified structure, it is possible to avoid a situation that the detection sensitivity is decreased, because the surface directions of the respective heat flux sensors 11 intersect with each other at the right angle.

Figure 18:
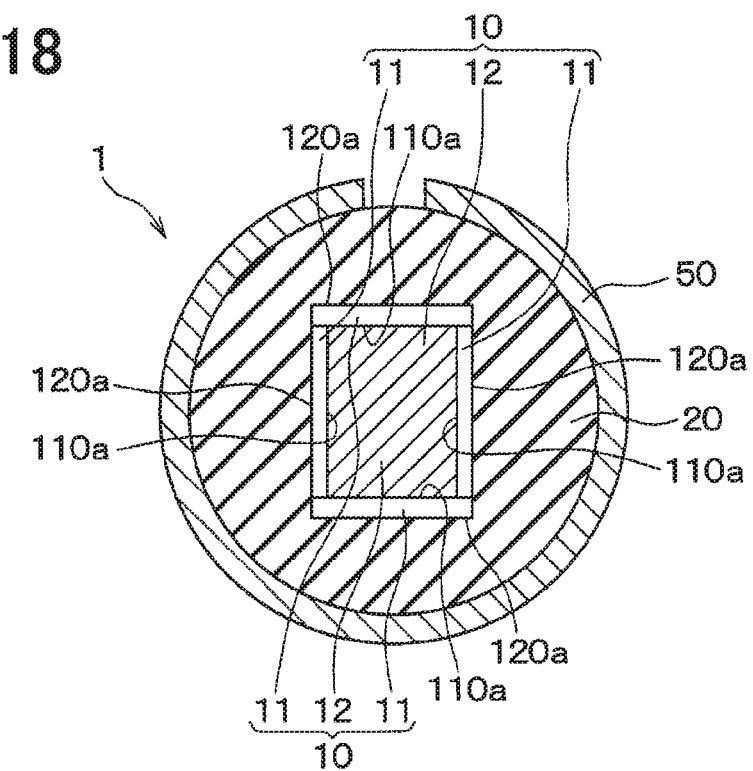
FIG. 18 is a schematic cross sectional view showing a strain detecting device according to a still further modification of the present disclosure.

(M16) In addition, as shown in FIG. 18, the strain detecting device 1 may have two sensor portions 10, which are so arranged that the surface directions of the respective heat flux sensors 11 intersect with each other at the right angle. According to such a modified structure, the heat flux generated when the elastic deformation member 20 is compressed or expanded passes through the first sensor surface 110a and the second sensor surface 120a of either one of the sensor portions 10. It is thereby possible to avoid the situation that the detection sensitivity is changed depending on the deformation portion (the deformation position) of the elastic deformation member 20. In FIG. 18, the heat absorbing member 12 is commonly used for the two sensor portions 10. However, the heat absorbing member 12 may be provided for each of the sensor portions 10. Namely, two sensor portions 10, each of which is identical to that of FIG. 2, are provided in such a way that the surface directions of the heat flux sensors 11 of the respective sensor portions 10 intersect with each other at the right angle.

(M17) In the strain detecting device 1 of the above first or the second embodiment, although the detection sensitivity may be changed depending on the deformation portion (the deformation position) of the elastic deformation member 20, it is possible to detect the strain. In other words, the strain detecting device 1 can detect the strain, evert when the external force is mainly applied to the portion of the elastic deformation member 20 not directly covering and opposing to the heat flux sensor 11. Therefore, the strain detecting device 1 of the third embodiment may be modified in the following manner. The strain detecting device 1 may be located in the sensor insertion hole 74 in such a way that the surface direction of the heat flux sensor 11 is almost in parallel to the main moving direction of the moving unit. In a similar manner, the strain detecting device 1 of the fourth embodiment may be modified in the following manner. Each of the arm portions 92 may be fixed to the base portion 91 in such a manner the surface direction of the heat flux sensor 11 is almost in parallel to the moving direction of the arm portion 92.

(M18) The above embodiments and/or modifications may be combined to one another. For example, the second embodiment may be combined to the third or the fourth embodiment, so that the elastic deformation member 20 of the third or the fourth embodiment is made of the material having the flow-ability.

What is claimed is:

1. A strain detecting device comprising:
  (i) a sensor portion for detecting heat flux; and
  (ii) an elastic deformation member covering the sensor portion, wherein the elastic deformation member generates heat, producing heat flux to be detected by the sensor portion, when it is compressed, while the elastic deformation member absorbs heat, producing heat flux to be detected by the sensor portion, when it is expanded,
  wherein the sensor portion includes two heat flux sensors, each of which has;
  a first sensor surface formed on a side of the heat flux sensor; and
  a second sensor surface formed on another side of the heat flux sensor opposite to the first sensor surface,
  wherein each of the heat flux sensors outputs a first sensor signal, indicative of strain of the elastic deformation member, having a positive or a negative polarity in a first case in which the heat flux passes through the heat flux sensor in a direction from the first sensor surface to the second sensor surface, while each of the heat flux sensors outputs a second sensor signal, indicative of strain of the elastic deformation member, having a polarity opposite to that of the first case in a second case in which the heat flux passes through the heat flux sensor in a reversed direction from the second sensor surface to the first sensor surface, wherein the sensor portion includes a heat absorbing member interposed between the two heat flux sensors and having a predetermined heat capacity, and wherein the two heat flux sensors are arranged in such a way that the first sensor surfaces of the respective heat flux sensors are opposed to each other across the heat absorbing member, and each of the heat flux sensors outputs the sensor signal depending on the heat flux generated by deformation of the elastic deformation member when external force is applied to the strain detecting device.

2. The strain detecting device according to claim 1, further comprising:

a housing for accommodating and covering the elastic deformation member, wherein the elastic deformation member is made of material having flow-ability and filled in the housing.

3. A diagnosing device for diagnosing a fastening condition of a fastener unit, which comprises;

a first fastener member;

a second fastener member; and a fastening member for fastening the first and the second fastener members to each other, wherein the diagnosing device comprises;

the strain detecting device according to claim 2; and a control unit for carrying out a diagnosing process for the fastening condition of the fastener unit, wherein the strain detecting device is located in a sensor insertion hole formed in the first and the second fastener members, so that external force generated in the fastener unit is applied to the strain detecting device, and wherein the control unit compares a sensor signal outputted from the strain detecting device with a predetermined determination parameter, to thereby diagnose the fastening condition of the fastener unit.

4. A diagnosing device for diagnosing a holding condition of a holding unit, which comprises;

a base portion; and multiple arm portions movably supported by the base portion for holding a holding object, wherein each of the arm portions is composed of the strain detecting device according to claim 2; and wherein the diagnosing device comprises a control unit for carrying out a diagnosing process for the holding condition of the holding unit, wherein the control unit compares a sensor signal outputted from the strain detecting device with a predetermined determination parameter, to thereby diagnose the holding condition of the holding unit.

5. A diagnosing device for diagnosing a fastening condition of a fastener unit, which comprises;

a first fastener member;

a second fastener member; and a fastening member for fastening the first and the second fastener members to each other, wherein the diagnosing device comprises;

the strain detecting device according to claim 1; and a control unit for carrying out a diagnosing process for the fastening condition of the fastener unit, wherein the strain detecting device is located in a sensor insertion hole formed in the first and the second fastener members, so that external force generated in the fastener unit is applied to the strain detecting device, and wherein the control unit compares a sensor signal outputted from the strain detecting device with a predetermined determination parameter, to thereby diagnose the fastening condition of the fastener unit.

6. A diagnosing device for diagnosing a holding condition of a holding unit, which comprises;

a base portion; and multiple arm portions movably supported by the base portion for holding a holding object, wherein each of the arm portions is composed of the strain detecting device according to claim 1; and wherein the diagnosing device comprises a control unit for carrying out a diagnosing process for the holding condition of the holding unit, wherein the control unit compares a sensor signal outputted from the strain detecting device with a predetermined determination parameter, to thereby diagnose the holding condition of the holding unit.

7. A strain detecting device comprising:

(i) a sensor portion for detecting heat flux; and (ii) an elastic deformation member covering the sensor portion, wherein the elastic deformation member generates heat, producing heat flux to be detected by the sensor portion, when it is compressed, while the elastic deformation member absorbs heat, producing heat flux to be detected by the sensor portion, when it is expanded, wherein the sensor portion includes a first and a second heat flux sensors, each of which has;

a first sensor surface formed on a side of the heat flux sensor; and a second sensor surface formed on another side of the heat flux sensor opposite to the first sensor surface, wherein each of the heat flux sensors outputs a first sensor signal, indicative of strain of the elastic deformation member, having a positive polarity when the heat flux passes through the heat flux sensor in a direction from the first sensor surface to the second sensor surface, while each of the heat flux sensors outputs a second sensor signal, indicative of strain of the elastic deformation member, having a negative polarity when the heat flux passes through the heat flux sensor in a reversed direction from the second sensor surface to the first sensor surface, wherein the sensor portion includes a heat absorbing member interposed between the first and the second heat flux sensors and having a predetermined heat capacity, and wherein the first and the second heat flux sensors are arranged in such a way that the first sensor surfaces of the respective heat flux sensors are opposed to each other across the heat absorbing member, and each of the heat flux sensors outputs the sensor signal depending on the heat flux generated by deformation of the elastic deformation member in such a way that a sensor signal level is changed for a unit time depending on the heat flux passing through the heat flux sensor.

\* \* \* \* \*